US011871243B2

(12) United States Patent
Sengupta et al.

(10) Patent No.: US 11,871,243 B2
(45) Date of Patent: Jan. 9, 2024

(54) SPECTRUM SHARING BETWEEN FIFTH GENERATION NEW RADIO AND LONG TERM EVOLUTION IN LICENSED AND UNLICENSED BANDS

(71) Applicant: Intel Corporation, Santa Clara, CA (US)

(72) Inventors: Avik Sengupta, San Jose, CA (US); Alexei Davydov, Nizhny Novgorod (RU); Bishwarup Mondal, San Ramon, CA (US); Yongjun Kwak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 16/994,229

(22) Filed: Aug. 14, 2020

(65) Prior Publication Data

US 2020/0382354 A1 Dec. 3, 2020

Related U.S. Application Data

(60) Provisional application No. 62/889,437, filed on Aug. 20, 2019, provisional application No. 62/888,342, filed on Aug. 16, 2019.

(51) Int. Cl.
*H04W 16/14* (2009.01)
*H04L 27/26* (2006.01)
(Continued)

(52) U.S. Cl.
CPC .......... *H04W 16/14* (2013.01); *H04L 1/0013* (2013.01); *H04L 5/001* (2013.01); *H04L 5/005* (2013.01);
(Continued)

(58) Field of Classification Search
CPC ...... H04W 16/14; H04L 1/0013; H04L 5/001; H04L 5/0042; H04L 5/0048; H04L 5/005;
(Continued)

(56) References Cited

U.S. PATENT DOCUMENTS

2018/0192404 A1\* 7/2018 Maaref ............ H04W 72/0453
2019/0223161 A1\* 7/2019 Muruganathan ...... H04L 5/0048
(Continued)

OTHER PUBLICATIONS

Ericsson, "Corrections to NR-based access to unlicensed spectrum," 3GPP TSG-RAN WG1 Meeting#100e, R1-2001437, Change Request, 37.213 CR 0007 rev—Current version: 16.0.0, Feb. 24-Mar. 3, 2020, e-Meeting, 9 pages.
(Continued)

*Primary Examiner* — Charles N Appiah
*Assistant Examiner* — Frank E Donado
(74) *Attorney, Agent, or Firm* — Schwabe, Williamson & Wyatt, P.C.

(57) ABSTRACT

Systems, apparatuses, methods, and computer-readable media, are provided for enabling coexistence between Third Generation Partnership Project (3GPP) Fifth Generation (5G) and Long Term Evolution (LTE) Radio Access Technologies (RATs). Disclosed embodiments enable 5G and LTE to simultaneously operate on the same licensed or unlicensed band such as for spectrum sharing between 5G and LTE RATs. Other embodiments may be described and/or claimed.

25 Claims, 13 Drawing Sheets

(51) Int. Cl.
H04L 5/00 (2006.01)
H04L 1/00 (2006.01)
H04L 25/02 (2006.01)

(52) U.S. Cl.
CPC .......... *H04L 5/0042* (2013.01); *H04L 5/0048* (2013.01); *H04L 5/0051* (2013.01); *H04L 25/0224* (2013.01); *H04L 27/261* (2013.01); *H04L 27/2613* (2013.01); *H04L 27/26025* (2021.01); *H04L 27/26136* (2021.01)

(58) Field of Classification Search
CPC .............. H04L 5/0051; H04L 25/0224; H04L 27/26025; H04L 27/261; H04L 27/2613; H04L 27/26136; H04L 5/0094; H04L 5/0062; H04L 27/2657
See application file for complete search history.

(56) References Cited

U.S. PATENT DOCUMENTS

| | | | | |
|---|---|---|---|---|
| 2019/0334691 | A1* | 10/2019 | Bendlin | H04L 5/0083 |
| 2020/0008216 | A1* | 1/2020 | Iyer | H04W 72/042 |
| 2020/0228180 | A1* | 7/2020 | Zhang | H04W 16/28 |
| 2022/0038234 | A1* | 2/2022 | Frenne | H04L 5/0048 |
| 2022/0124768 | A1* | 4/2022 | Frenne | H04L 5/0048 |
| 2022/0150030 | A1* | 5/2022 | Li | H04L 1/1864 |
| 2022/0183006 | A1* | 6/2022 | Mauritz | H04L 5/005 |
| 2022/0303092 | A1* | 9/2022 | Maki | H04W 72/044 |
| 2022/0304039 | A1* | 9/2022 | Jiang | H04B 7/024 |

OTHER PUBLICATIONS

Huawei, "Corrections for Rel-16 NR-U after RAN1#100-e," 3GPP TSG-RAN WG1 Meeting #100-e, R1-2001461, Change Request 38.212 CR 0032 rev Current version: 16.0.0, Feb. 24-Mar. 6, 2020, 12 pages.
Samsung, "Corrections on shared spectrum channel access," 3GPP TSG-RAN WG1 Meeting #100-e, R1-2001456, Change Request 38.213 CR 0091 rev—Current version: 16.0.0, 24—Mar. 6, 2020, e-Meeting, 20 pages.
Nokia, "Corrections on NR-U," 3GPP TSG-RAN WG1 Meeting #100, R1-2001441, Change Request 38.214 CR 0068 rev—Current version: 16.0.0, Feb. 24-Mar. 6, 2020, e-meeting, 9 pages.
RAN1, "Corrections for Rel-16 NR-U after RAN1#100-e," 3GPP TSG-RAN Meeting #87, RP-200185, Agenda item: 9.3.3, Mar. 16, 2020-Mar. 19, 2020, Online, 1 page.
Ad Hoc Chair (Ericsson), "Chairman's notes of AI 7.2.2 Study on NR-based Access to Unlicensed Spectrum," 3GPP TSG-RAN WG1 Meeting #97, Tdoc R1-1907846, Agenda item: 7.2.2, May 13-17, 2019, Reno, USA, 8 pages.
Intel Corporation, "On multi-TRP/multi-panel transmission," 3GPP TSG RAN WG1 Meeting #97, R1-1907559, Agenda item: 7.2.8.2, May 13-17, 2019, Reno, Nevada, USA, 21 pages.
Ericsson, "Corrections to NR-based access to unlicensed spectrum," 3GPP TSG-RAN WG1 Meeting 100e, R1-2001470, Change Request 38.211 CR 0037 rev—Current version: 16.0.0, Feb. 24-Mar. 3, 2020, Elbonia, 12 pages.
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.6.0 (Jun. 2019), 5G, 365 pages.

* cited by examiner

SPECTRUM SHARING BETWEEN FIFTH GENERATION NEW RADIO AND LONG TERM EVOLUTION IN LICENSED AND UNLICENSED BANDS

RELATED APPLICATIONS

The present application claims priority to, and/or is a continuation of U.S. Provisional App. No. 62/888,342 titled "SYSTEM AND METHOD FOR SPECTRUM SHARING BETWEEN NR AND LTE IN LICENSED AND UNLICENSED BANDS" filed on Aug. 16, 2019 (AC4449-Z) and U.S. Provisional App. No. 62/889,437 titled "SYSTEM AND METHOD FOR SPECTRUM SHARING BETWEEN NR AND LTE IN LICENSED AND UNLICENSED BANDS" filed on Aug. 20, 2019 (AC4513-Z), the contents of each of which are hereby incorporated by reference in its entireties.

FIELD

Various embodiments of the present application generally relate to the field of wireless communications, and in particular to spectrum sharing in cellular communication networks.

BACKGROUND

Third Generation Partnership Project (3GPP) Fifth Generation (5G)/New Radio (NR) release 16 specifies access to both licensed and unlicensed spectrum. For licensed access, non-coherent joint transmission (NC-JT), transmission in the downlink (DL) from multiple Transmission/Reception Points (TRxPs), or multiple panels of a TRxP to user equipment (UE) is being specified. For both licensed and unlicensed access, the 5G/NR radio access technology (RAT) might operate on a component carrier (CC) with subcarrier spacing of 15 kilohertz (kHz) or 30 kHz, which overlaps fully or partially with Long Term Evolution (LTE) or LTE Licensed Assisted Access (LAA) CCs that operate with a subcarrier spacing of 15 kHz. There are currently no mechanisms that provide spectrum sharing among 5G/NR and LTE RATs that prevent or avoid reference signal collisions between these two RATs.

DETAILED DESCRIPTION

In the detailed description to follow, for ease of understanding, the present disclosure will be presented in the context of the Third Generation Partnership Project (3GPP) systems. However, the present disclosure is not limited to 3GPP compliant system only, and may be practiced in any communication system or network.

Embodiments described herein are related to coexistence mechanisms that allow 5G/NR systems and LTE systems to simultaneously operate on the same licensed or unlicensed band (e.g., for spectrum sharing between 5G/NR and LTE systems). Since many deployment scenarios will involve LTE RATs being superimposed on 5G/NR RATs, 5G/NR component carriers (CCs) could fully or partially overlap with LTE CCs. Embodiments include techniques for signaling 5G/NR RATs to avoid collisions of Demodulation Reference Signal (DMRS) symbols with LTE Cell-specific Reference Signal (CRS) symbols. Furthermore, embodiments include techniques for rate matching of 5G/NR Physical Downlink Shared Channel (PDSCH) around LTE CRS patterns for licensed and unlicensed spectrum. Efficient channel estimation is enabled for both 5G/NR and LTE coexisting in the same licensed or unlicensed frequency band by ensuring LTE CRS symbols and 5G/NR DMRS symbols do not collide with each other for cases when slot boundaries for 5G/NR and LTE operation are aligned. Other embodiments may be described and/or claimed.

Figure 1:
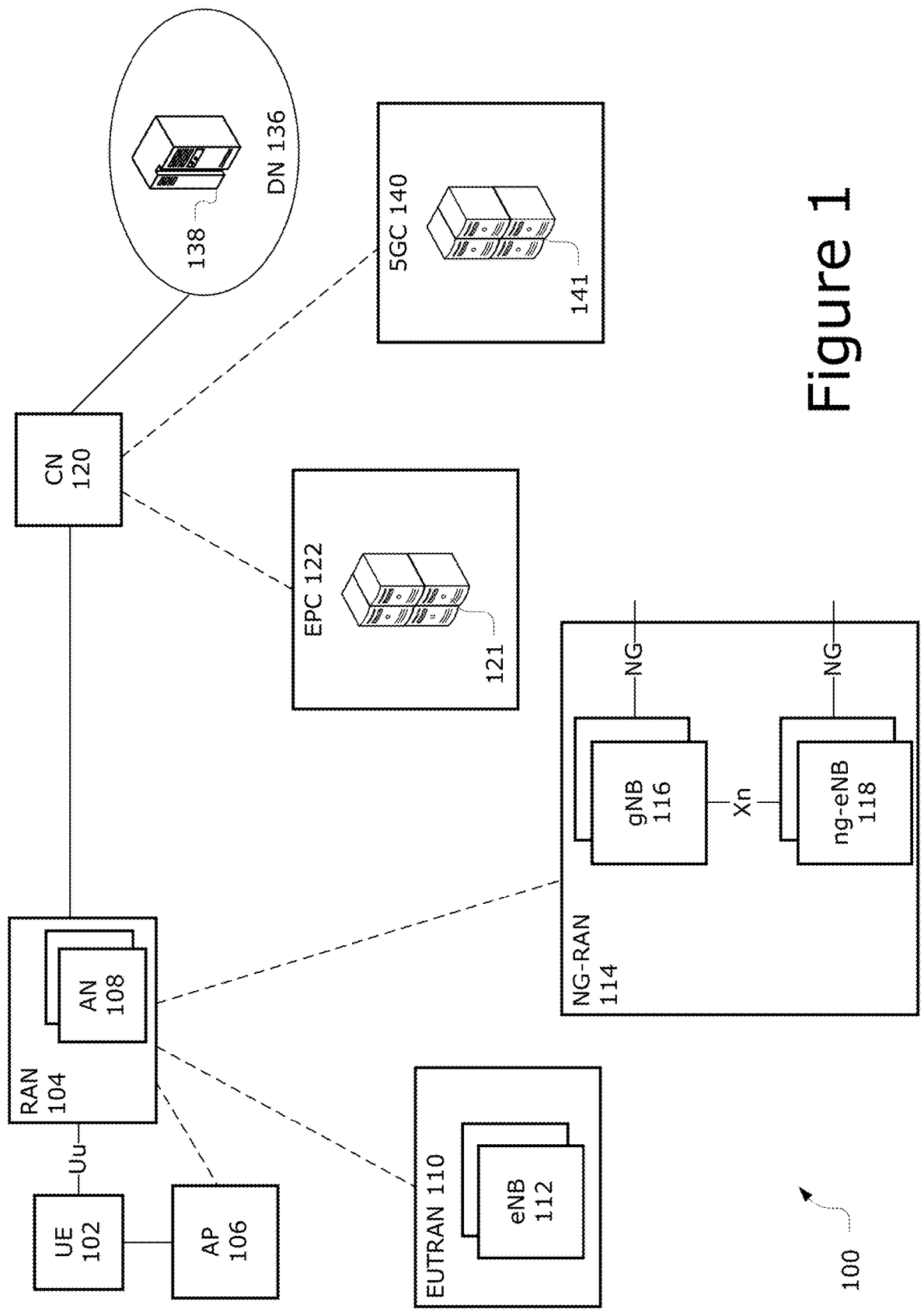
FIG. 1 illustrates an example network architecture according to various embodiments.

Referring now to FIG. 1, which illustrates a network 100 in accordance with various embodiments. The network 100 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 100 includes a UE 102, which is any mobile or non-mobile computing device designed to communicate with a RAN 104 via an over-the-air connection. The UE 102 is communicatively coupled with the RAN 104 by a Uu interface, which may be applicable to both LTE and NR systems. Examples of the UE 102 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 100 may include a plurality of UEs 102 coupled directly with one another via a D2D, ProSe, PC5, and/or sidelink (SL) interface. These UEs 102 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 102 may additionally communicate with an AP 106 via an over-the-air (OTA) connection. The AP 106 manages a WLAN connection, which may serve to offload some/all network traffic from the RAN 104. The connection between the UE 102 and the AP 106 may be consistent with any IEEE 802.11 protocol. Additionally, the UE 102, RAN 104, and AP 106 may utilize cellular-WLAN aggregation/integration (e.g., LWA/LWIP). Cellular-WLAN aggregation may involve the UE 102 being configured by the RAN 104 to utilize both cellular radio resources and WLAN resources.

The RAN 104 includes one or more access network nodes (ANs) 108. The ANs 108 terminate air-interface(s) for the UE 102 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 108 enables data/voice connectivity between CN 120 and the UE 102. The ANs 108 may be a macrocell base station or a low power base station for providing femtocells, picocells or other like cells having smaller coverage areas, smaller user capacity, or higher bandwidth compared to macrocells; or some combination thereof. In these implementations, an 108 be referred to as a BS, gNB, RAN node, eNB, ng-eNB, NodeB, RSU, TRxP, etc.

One example implementation is a "CU/DU split" architecture where the ANs 108 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP Technical Specification (TS) 38.401 version (v) 15.7.0 (2020-01-09)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 108 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 104 is an LTE RAN or Evolved Universal Terrestrial Radio Access Network (E-UTRAN) 110) or an Xn interface (if the RAN 104 is a NG-RAN 114). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs 108 of the RAN 104. For example, the UE 102 and RAN 104 may use Carrier Aggregation (CA) to allow the UE 102 to connect with a plurality of component carriers, each corresponding to a PCell or SCell. A PCell is an MCG cell, operating on a primary frequency, in which the UE 102 performs an initial connection establishment procedure and/or initiates a connection re-establishment procedure. An SCell is a cell providing additional radio resources on top of a Special Cell (SpCell) when the UE 102 is configured with CA. In CA, two or more Component Carriers (CCs) are aggregated. The UE 102 may simultaneously receive or transmit on one or multiple CCs depending on its capabilities. A UE 102 with single timing advance capability for CA can simultaneously receive and/or transmit on multiple CCs corresponding to multiple serving cells sharing the same timing advance (multiple serving cells grouped in one timing advance group (TAG)). A UE 102 with multiple timing advance capability for CA can simultaneously receive and/or transmit on multiple CCs corresponding to multiple serving cells with different timing advances (multiple serving cells grouped in multiple TAGs). The NG-RAN 114 ensures that each TAG contains at least one serving cell; A non-CA capable UE 102 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 102. In some implementations, the maximum number of configured CCs for a UE 102 is 16 for DL and 16 for UL.

In Dual Connectivity (DC) scenarios, a first AN 108 may be a master node that provides a Master Cell Group (MCG) and a second AN 108 may be secondary node that provides an Secondary Cell Group (SCG). The first and second ANs 108 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 102 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

The UE 102 can be configured to communicate using Orthogonal Frequency Division Multiplexing (OFDM) communication signals with other UEs 102 or with any of the AN 108 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal sub carriers.

In some embodiments, the RAN 104 may be an E-UTRAN 110 with one or more eNBs 112. The E-UTRAN 110 provides an LTE air interface (Uu) with the following characteristics: subcarrier spacing (SCS) of 15 kHz, 7.5 kHz, 2.5 kHz, 1.25 kHz, or approximately 0.37 kHz (depending on the cyclic prefix); cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In LTE systems, DL and UL transmissions are organized into radio frames with 10 millisecond (ms) durations. Three radio frame structures are supported including Type 1 which is applicable to Frequency Division Duplex (FDD); Type 2 which is applicable to Time Division Duplex (TDD); and Type 3 which is applicable to Licensed Assisted Access (LAA) secondary cell operation only. Each of these radio frame types are discussed in detail in 3GPP TS 36.300 v15.6.0 (2019-06-29) (hereinafter "[TS36300]").

In the DL, the transmitted signal in each slot is described by one or several resource grids of $N_{RB}^{DL} N_{sc}^{RB}$ subcarriers and $N_{symb}^{DL}$ OFDM symbols, where $N_{RB}^{DL}$ is the DL bandwidth configuration expressed in multiples of $N_{sc}^{RB}$, is a resource block (RB) size in the frequency domain expressed as a number of subcarriers (e.g., the number of subcarriers per RB), and $N_{symb}^{DL}$ is the number of OFDM symbols in a DL slot. The quantity $N_{RB}^{DL}$ depends on the DL transmission bandwidth configured in a cell and fulfils $N_{RB}^{min,DL} \leq N_{RB}^{DL} \leq N_{RB}^{max,DL}$ where $N_{RB}^{min,DL}=6$ and $N_{RB}^{max,DL}=110$ are the smallest and largest DL bandwidths configuration expressed in multiples of $N_{sc}^{RB}$, respectively. The set of allowed values for $N_{RB}^{DL}$ is given by 3GPP TS 36.104 v15.7.0 (2019-07-01). The number of OFDM symbols in a slot depends on the configured CP length and SCS and is given in Table 6.2.3-1 of 3GPP TS 36.211 v15.6.0 (2019-06-24) (hereinafter "[TS36211]"). For example, an SCS of 15 kHz ($\Delta f=15$ kHz) has 12 subcarriers per resource block (e.g., $N_{sc}^{RB}=12$) and 6 or 7 OFDM symbols per subframe (e.g., $N_{symb}^{DL}=6$ or $N_{symb}^{DL}=7$) for both normal and extend CP.

Each element in the LTE resource grid for antenna port p is called a resource element (RE) and is uniquely identified by an index pair (k, l) in a slot, where $k=0, \ldots, N_{RB}^{DL} N_{sc}^{RB}-1$ and $l=0, \ldots, N_{symb}^{RB}-1$ is the indices in the frequency domain and the symbol position in the time domain, respectively. RE (k, l) on antenna port p corresponds to the complex value $a_{k,l}^{(p)}$. Resource blocks (RBs) are used to describe the mapping of certain physical channels to resource elements. RBs include physical RBs (PRBs) and virtual RBs (VRBs) are defined. A PRB is $N_{symb}^{DL} \times N_{sc}^{RB}$ REs, corresponding to one slot in the time domain and 180 kHz in the frequency domain. PRBs are numbered from $0, \ldots, N_{RB}^{DL}-1$ in the frequency domain. VRBs are discussed by section 6.2.3.1 and 6.2.3.2 in [TS36211].

Figure 2:
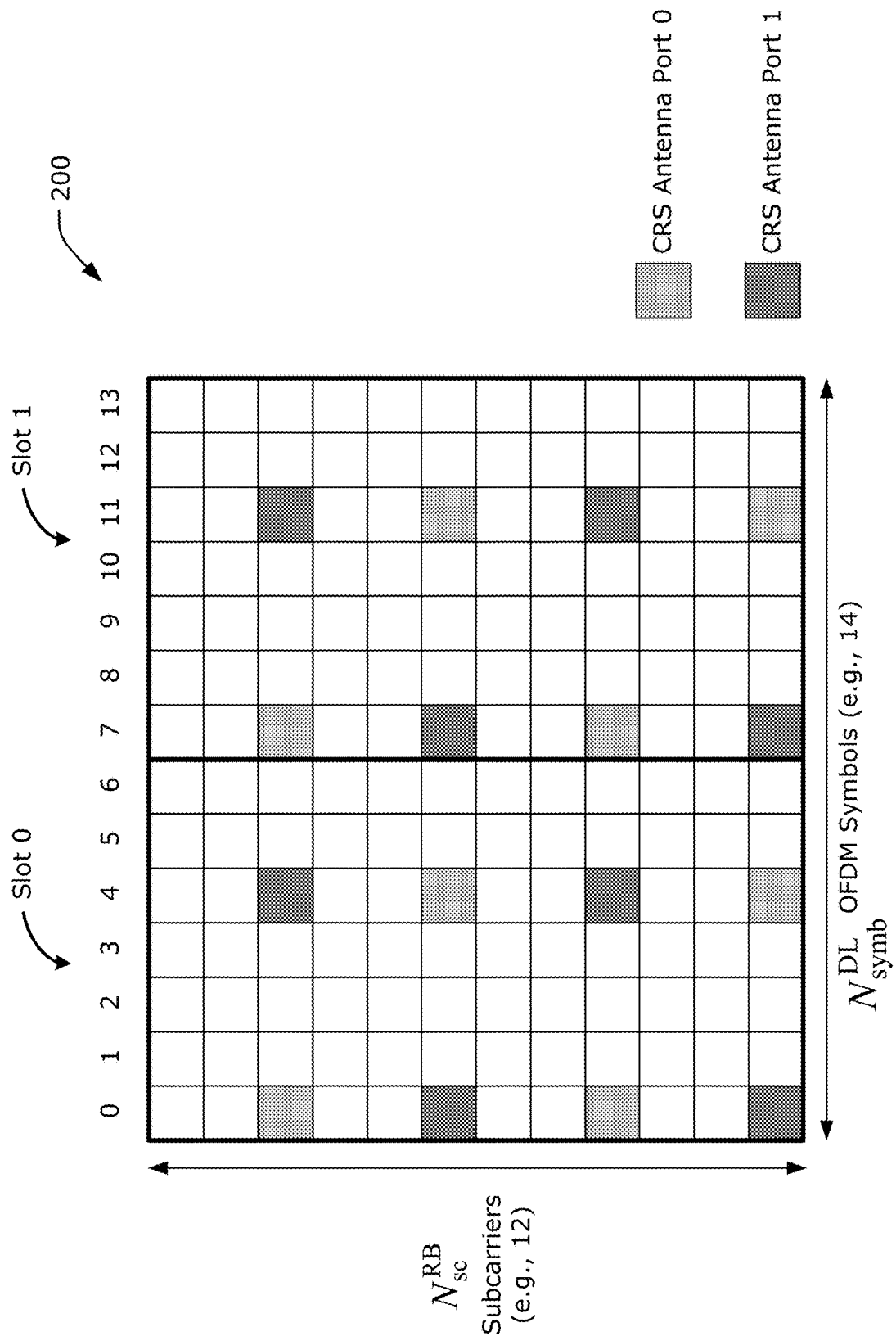
FIG. 2 illustrates an example of Long Term Evolution (LTE) Cell-specific Reference Signal (CRS) Antenna Ports 0 and 1.

FIG. 2, which illustrates an example of LTE subframe 200 highlighting CRS Antenna Ports 0 and 1. As shown by FIG. 2, CRSs in LTE systems can be transmitted within a subframe at OFDM symbols 0, 4, 7, 11 in the time domain (where indexing is from symbol 0-13) and in REs 2, 5, 8, 11 within a PRB in the frequency domain (where indexing is from RE 0-11).

In LTE systems, an antenna port is defined such that the channel over which a symbol on the antenna port is conveyed can be inferred from the channel over which another symbol on the same antenna port is conveyed. There is one resource grid per antenna port. The set of antenna ports supported depends on the RS configuration in a cell. In particular, CRSs support a configuration of one, two, or four antenna ports and are transmitted on antenna ports p=0, p∈{0, 1}, and p∈{0, 1, 2, 3}, respectively. The UE 102 may assume CRSs are, unless otherwise stated in clause 12 of 3GPP TS 36.212 v15.6.0 (2019-06-24) (hereinafter "[TS36212]"), transmitted in all downlink subframes for frame structure type 1 and frame structure type 2, and non-empty subframes for frame structure type 3 in a cell supporting PDSCH transmission. CSRs are transmitted on one or several of antenna ports 0 to 3 and in subframes where $\Delta f=15$ kHz only. A DMRS associated with Enhanced PDCCH (EPDCCH), MTC PDCCH (MPDCCH), or Short PDCCH (SPDCCH) is transmitted on the same antenna port p∈{107, 108, 109, 110} as the associated EPDCCH/MPDCCH/SPDCCH physical resource; is present and is a valid reference for EPDCCH/MPDCCH/SPDCCH demodulation only if the EPDCCH/MPDCCH/SPDCCH transmission is associated with the corresponding antenna port; and is transmitted only on the physical resource blocks upon which the corresponding EPDCCH/MPDCCH/SPDCCH is mapped. A DMRS associated with EPDCCH/MPDCCH/SPDCCH is not transmitted in resource elements (k, l) in which one of the physical channels or physical signals other than the DMRS defined in 6.1 of [TS36211] are transmitted using resource elements with the same index pair (k, l) regardless of their antenna port p.

In some embodiments, the RAN 104 may be an next generation (NG)-RAN 114 with one or more gNB 116 and/or on or more ng-eNB 118. The gNB 116 connects with 5G-enabled UEs 102 using a 5G NR interface. The gNB 116 connects with a 5GC 140 through an NG interface, which includes an N2 interface or an N3 interface. The ng-eNB 118 also connects with the 5GC 140 through an NG interface, but may connect with a UE 102 via the Uu interface. The gNB 116 and the ng-eNB 118 may connect with each other over an Xn interface. The NG interface may be split into two parts, an NG user plane (NG-U) interface, which carries traffic data between the nodes of the NG-RAN 114 and a UPF (e.g., N3 interface), and an NG control plane (NG-C) interface, which is a signaling interface between the nodes of the NG-RAN 114 and an AMF (e.g., N2 interface).

The NG-RAN 114 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

In 5G/NR systems, DL, UL, and SL transmissions are organized into frames with $T_f = (\Delta f_{max} N_f/100) \cdot T_c = 10$ ms duration, each including ten subframes of $T_{sf} = (\Delta f_{max} N_f/1000) \cdot T_c = 1$ ms duration. The number of consecutive OFDM symbols per subframe is $N_{symb}^{subframe,\mu} = N_{symb}^{slot} N_{slot}^{subframe,\mu}$ where $N_{symb}^{subframe,\mu}$ is the number of OFDM symbols per subframe for SCS configuration $\mu$ (see e.g., clause 4.3.1 in 3GPP TS 38.211 v15.6.0 (2019-06-24) (hereinafter "[TS38211]"), $N_{symb}^{slot}$ is the number of symbols per slot, and $N_{slot}^{subframe,\mu}$ is the number of slots per subframe for SCS configuration $\mu$ (see e.g., clause 4.3.2 in [TS38211]). Each frame is divided into two equally-sized half-frames of five subframes each with half-frame 0 including subframes 0-4 and half-frame 1 including subframes 5-9. There is one set of frames in the uplink and one set of frames in the DL on a carrier. UL frame number i for transmission from the UE 102 starts $T_{TA}=(N_{TA}+N_{TA,offset})T_c$ before the start of the corresponding DL frame at the UE 102 where $N_{TA,offset}$ is given by 3GPP TS 38.213 v15.6.0 (2019-06-24) (hereinafter "[TS38213]"), except for msgA transmission on the Physical Uplink Control Channel (PUSCH) where $N_{TA}=0$ is used.

There is one resource grid (also referred to as a time-frequency grid or the like) for a given antenna port p, SCS configuration μ, and transmission direction (e.g., DL, UL, or SL). For each numerology and carrier, a resource grid of $N_{grid}^{size,\mu} N_{sc}^{RB}$ subcarriers and $N_{symb}^{subframe,\mu}$ OFDM symbols is defined, starting at common RB (CRB) $N_{grid}^{start,\mu}$ indicated by higher-layer signalling. In 5G/NR, an RB is defined as $N_{sc}^{RB}=12$ consecutive subcarriers in the frequency domain.

In 5G/NR, each element in the resource grid for antenna port p and SCS configuration μ is called an RE and is uniquely identified by $(k,l)_{p,\mu}$ where k is the index in the frequency domain and l refers to the symbol position in the time domain relative to some reference point. RE $(k,l)_{p,\mu}$ corresponds to a physical resource and the complex value $a_{k,l}^{(p,\mu)}$. Each resource grid comprises a number of RBs, which describe the mapping of certain physical channels to REs. Additionally, each RB comprises a collection of REs, and an RE represents the smallest time-frequency unit in a resource grid.

PRBs for SCS configuration μ are defined within a bandwidth part (BWP) and numbered from 0 to $N_{BWP,i}^{size,\mu}-1$ where i is the number of the BWP. The relation between the physical resource block $n_{PRB}^{\mu}$ in BWP i and the common resource block $n_{CRB}^{\mu}$ is given by $n_{CRB}^{\mu}=n_{PRB}^{\mu}+N_{BWP,i}^{start,\mu}$ where $N_{BWP,i}^{start,\mu}$ is the CRB where BWP i starts relative to CRB 0. Virtual resource blocks (VRBs) are defined within a BWP and numbered from 0 to $N_{BWP,i}^{size}-1$ where i is the number of the BWP.

In 5G/NR, an antenna port is defined such that a channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DMRS symbol on the same antenna port is conveyed only if the two symbols are within the same resource as the scheduled PDSCH, in the same slot, and in the same PRG (see e.g., clause 5.1.2.3 of 3GPP TS 38.214 v15.6.0 (2019-06-24) (hereinafter "[TS38214]"). For DMRS associated with a PDCCH, the channel over which a PDCCH symbol on one antenna port is conveyed can be inferred from the channel over which a DMRS symbol on the same antenna port is conveyed only if the two symbols are within resources for which the UE may assume the same precoding being used (see e.g., clause 7.3.2.2 of [TS38211]). For DM-RS associated with a PBCH, the channel over which a PBCH symbol on one antenna port is conveyed can be inferred from the channel over which a DMRS symbol on the same antenna port is conveyed only if the two symbols are within a SS/PBCH block transmitted within the same slot, and with the same block index (see e.g., clause 7.4.3.1 of [TS38211]). Two antenna ports are said to be quasi co-located (QCL'd) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The DL transmission scheme includes, inter alia, a closed loop DMRS based spatial multiplexing is supported for PDSCH. In some implementations, up to 8 and 12 orthogonal DL DMRS ports are supported for type 1 and type 2 DMRS respectively. In some implementations, up to 8 orthogonal DL DMRS ports per UE 102 are supported for single user (SU)-multiple input multiple output (MIMO) and up to 4 orthogonal DL DMRS ports per UE are supported for multi-user (MU)-MIMO. The number of SU-MIMO code words is one for 1-4 layer transmissions and two for 5-8 layer transmissions. The DMRS and corresponding PDSCH are transmitted using the same precoding matrix and the UE 102 does not need to know the precoding matrix to demodulate the transmission. The transmitter may use different precoder matrix for different parts of the transmission bandwidth, resulting in frequency selective precoding. The UE 102 may also assume that the same precoding matrix is used across a set of PRBs, which is denoted as a Precoding Resource Block Group (PRG). Transmission durations from 2 to 14 symbols in a slot is supported, and aggregation of multiple slots with Transport Block (TB) repetition is supported.

Data and control streams from/to the MAC layer are encoded/decoded to offer transport and control services over the radio transmission link. A channel coding scheme is a combination of error detection, error correcting, rate matching, interleaving and transport channel or control information mapping onto/splitting from physical channels.

The PHY layer processing for the PDSCH and/or PHY layer processing of transport channels includes the following steps: transport block CRC attachment; code block segmentation and code block CRC attachment; channel coding (e.g., LDPC coding); PHY layer HARQ processing; rate matching; scrambling; modulation (e.g., QPSK, 16QAM, 64QAM and 256QAM); layer mapping; and mapping to assigned resources and antenna ports. The UE 102 may assume that at least one symbol with DMRS is present on each layer in which PDSCH is transmitted to the UE 102, and up to 3 additional DMRS can be configured by higher layers. Rate matching means that bits on a transport channel (TrCH) are repeated or punctured. Higher layers assign a rate-matching attribute for each TrCH. This attribute is semi-static and can only be changed through higher layer signaling. The rate-matching attribute is used when the number of bits to be repeated or punctured is calculated. Various aspects of rate matching are discussed in 3GPP TS 25.213 v15.0.0 (2017-09-25) and 3GPP TS 38.212 v15.6.0 (2019-06-24).

Additionally, the PDCCH can be used to schedule DL transmissions on PDSCH and UL transmissions on PUSCH, where the Downlink Control Information (DCI) on PDCCH includes: DL assignments containing at least modulation and coding format, resource allocation, and HARQ information related to DL shared channel (DL-SCH), and UL scheduling grants containing at least modulation and coding format, resource allocation, and HARQ information related to UL shared channel (UL-SCH). The UE 102 monitors a set of PDCCH candidates in configured monitoring occasions in one or more configured Control Resource Sets (CORESETs) according to corresponding search space configurations. A CORESET includes a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCE(s). Different code rates for the control channels are realized by aggregating different number of CCEs. Interleaved and non-interleaved CCE-to-REG mapping are supported in a CORESET. Polar coding and QPSK modulation is used for PDCCH. Each REG carrying PDCCH carries its own DMRS.

In 5G/NR, the UE 102 assumes the PDSCH DMRS is being mapped to physical resources according to configuration type 1 or configuration type 2 as given by the higher-layer parameter dmrs-Type. The UE 102 assumes the sequence r(m) is scaled by a factor $\beta_{PDSCH}^{DMRS}$ to conform with the transmission power specified in [TS38214] and mapped to resource elements $(k,l)_{p,\mu}$ according to:

$$a_{k,l}^{(p,\mu)} = \beta_{PDSCH}^{DMRS} w_f(k')w_t(l')r(2n+k')$$
$$k = \begin{cases} 4n + 2k' + \Delta & \text{Configuration type 1} \\ 6n + k' + \Delta & \text{Configuration type 2} \end{cases}$$
$$k' = 0, 1$$
$$l = \bar{l} + l'$$
$$n = 0, 1, \ldots$$

In the above equation, $w_f(k')$, $w_t(l')$, and $\Delta$ are given by Tables 7.4.1.1.2-1 and 7.4.1.1.2-2 in [TS38211] and the REs are within the common RBs allocated for PDSCH transmission. The reference point for k is subcarrier 0 of the lowest-numbered resource block in CORESET 0 if the corresponding PDCCH is associated with CORESET 0 and Type0-PDCCH common search space and is addressed to SI-RNTI; otherwise, subcarrier 0 in common resource block 0.

The reference point for l and the position $l_0$ of the first DMRS symbol depends on the mapping type. Various aspects of the PDSCH mapping types are discussed in [TS38211].

For PDSCH mapping type A, l is defined relative to the start of the slot and $l_0=3$ if the higher-layer parameter dmrs-TypeA-Position is equal to 'pos3' and $l_0=2$ otherwise. For PDSCH mapping type B, l is defined relative the start of the scheduled PDSCH resources and $l_0=0$. The position(s) of the DMRS symbols is given by $\bar{l}$ and duration $l_d$ and according to Tables 7.4.1.1.2-3 and 7.4.1.1.2-4 in [TS38211]. For PDSCH mapping type A, $l_d$ is the duration between the first OFDM symbol of the slot and the last OFDM symbol of the scheduled PDSCH resources in the slot, and for PDSCH mapping type B, $l_d$ is the duration of the scheduled PDSCH resources.

For PDSCH mapping type A, the case dmrs-AdditionalPosition equals to 'pos3' is only supported when dmrs-TypeA-Position is equal to 'pos2'; $l_d=3$ and $l_d=4$ symbols in Tables 7.4.1.1.2-3 and 7.4.1.1.2-4 respectively is only applicable when dmrs-TypeA-Position is equal to 'pos2'; and single-symbol DM-RS, $l_1=11$ except if all of the following conditions are fulfilled in which case $l_1=12$: the higher-layer parameter lte-CRS-ToMatchAround or additionalLTE-CRS-ToMatchAroundList is configured; the higher-layer parameter dmrs-AdditionalPosition is equal to 'pos1' and $l_0=3$; and the UE 102 has indicated it is capable of additionalDMRS-DL-Alt.

For PDSCH mapping type B if the PDSCH duration $l_d \in \{2, 3, 4, 5, 6, 7, 8, 9, 10, 11, 12, 13\}$ OFDM symbols for normal cyclic prefix or $l_d \in \{2, 4, 6\}$ OFDM symbols for extended cyclic prefix, and the front-loaded DM-RS of the PDSCH allocation collides with resources reserved for a search space set associated with a CORESET, $\bar{l}$ shall be incremented such that the first DM-RS symbol occurs immediately after the CORESET and until no collision with any CORESET occurs, and if the PDSCH duration $l_d$ is 2 symbols, the UE 102 is not expected to receive a DMRS symbol beyond the second symbol. If the PDSCH duration $l_d$ is 5 symbols and if one additional single-symbol DMRS is configured, the UE 102 expects the additional DMRS to be transmitted on the fifth symbol.

If the PDSCH duration $l_d$ is 7 symbols for normal CP or 6 symbols for extended CP, then the UE 102 is not expected to receive the front-loaded DMRS beyond the fourth symbol. If the one additional single-symbol DMRS is configured, the UE 102 only expects the additional DMRS to be transmitted on the 5th or 6th symbol when the front-loaded DMRS symbol is in the 1st or 2nd symbol, respectively, of the PDSCH duration, otherwise the UE 102 should expect that the additional DM-RS is not transmitted.

If the PDSCH duration $l_d$ is 12 or 13 symbols, the UE 102 is not expected to receive a DMRS symbol mapped to symbol 12 or later in the slot. For all values of the PDSCH duration $l_d$ other than 2, 5, and 7 symbols, the UE 102 is not expected to receive a DMRS symbol beyond the $(l_d-1)$:th symbol. If the PDSCH duration $l_d$ is less than or equal to 4 OFDM symbols, only single-symbol DM-RS is supported.

Additionally or alternatively, if the higher-layer parameter lte-CRS-ToMatchAround or additionalLTE-CRS-ToMatchAroundList is configured, the PDSCH duration $l_d=10$ symbols for normal cyclic prefix, the subcarrier spacing configuration $\mu=0$, single-symbol DM-RS is configured, and at least one PDSCH DM-RS symbol in the PDSCH allocation collides with a symbol containing resource elements as indicated by the higher-layer parameter lte-CRS-ToMatchAround or additionalLTE-CRS-ToMatchAroundList, then $\bar{l}$ shall be incremented by one in all slots.

The time-domain index l' and the supported antenna ports p are given by Table 7.4.1.1.2-5 in [TS38211] where single-symbol DM-RS is used if the higher-layer parameter maxLength in the DMRS-DownlinkConfig IE is not configured; and/or single-symbol or double-symbol DM-RS is determined by the associated DCI if the higher-layer parameter maxLength in the DMRS-DownConfig DownlinkConfig IE is equal to 'len2'.

In absence of CSI-RS configuration, and unless otherwise configured, the UE 102 may assume PDSCH DM-RS and SSB to be QCL'd with respect to Doppler shift, Doppler spread, average delay, delay spread, and, when applicable, spatial Rx parameters. Unless specified otherwise, the UE may assume that the PDSCH DM-RS within the same code division multiplexing (CDM) group are QCL'd with respect to Doppler shift, Doppler spread, average delay, delay spread, and spatial Rx (when applicable). The UE 102 may assume that DMRS ports associated with a TCI state as described in clause 5.1.6.2 of [TS38214] of a PDSC/H are QCL with QCL Type A, Type D (when applicable) and average gain. Moreover, the UE 102 may assume that no DM-RS collides with the SSB.

The 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (e.g., PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

A BWP is a subset of contiguous common resource blocks defined in clause 4.4.4.3 of [TS38211] or a given numerology μ, in BWP i on a given carrier. The starting position $N_{BWP,i}^{start,\mu}$ and the number of RBs $N_{BWP,i}^{size,\mu}$ in a BWP fulfils $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a BWP is described in clause 12 of [TS38213]. The UE 102 can be configured with up to four BWPs in the downlink with a single downlink BWP being active at a given time. The UE is not expected to receive PDSCH, PDCCH, or CSI-RS (except for RRM) outside an active BWP. The UE 102 can be configured with up to four BWPs in the uplink with a single uplink BWP being active at a given time. If the UE 102 is configured with a supplementary uplink, the UE 102 can in addition be configured with up to four BWPs in the supplementary uplink with a single supplementary uplink BWP being active at a given time. The UE 102 does not transmit PUSCH or PUCCH outside an active BWP. For an active cell, UE 102 does not transmit SRS outside an active BWP.

The RAN 104 is communicatively coupled to CN 120, which includes network elements and/or network functions (NFs) to provide various functions to support data and telecommunications services to customers/subscribers (e.g., UE 102). The network elements and/or NFs may be implemented by one or more servers 121, 141. The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

The CN 120 may be an LTE CN 122 (also referred to as an Evolved Packet Core (EPC) 122). The EPC 122 may include MME, SGW, SGSN, HSS, PGW, PCRF, and/or other NFs coupled with one another over various interfaces (or "reference points") (not shown). The CN 120 may be a 5GC 140 including an AUSF, AMF, SMF, UPF, NSSF, NEF, NRF, PCF, UDM, AF, and/or other NFs coupled with one another over various service-based interfaces and/or reference points. The 5GC 140 may enable edge computing by selecting operator/3rd party services to be geographically close to a point that the UE 102 is attached to the network. This may reduce latency and load on the network. In edge computing implementations, the 5GC 140 may select a UPF close to the UE 102 and execute traffic steering from the UPF to DN 136 via the N6 interface. This may be based on the UE subscription data, UE location, and information provided by the AF, which allows the AF to influence UPF (re)selection and traffic routing.

The data network (DN) 136 may represent various network operator services, Internet access, or third party services that may be provided by one or more servers including, for example, application (app)/content server 138. The DN 136 may be an operator external public, a private PDN, or an intra-operator packet data network, for example, for provision of IMS services. In this embodiment, the server 138 can be coupled to an IMS via an S-CSCF or the I-CSCF. In some implementations, the DN 136 may represent one or more local area DNs (LADNs), which are DNs 136 (or DN names (DNNs)) that is/are accessible by a UE 102 in one or more specific areas. Outside of these specific areas, the UE 102 is not able to access the LADN/DN 136.

Additionally or alternatively, the DN 136 may be an Edge DN 136, which is a (local) Data Network that supports the architecture for enabling edge applications. In these embodiments, the app server 138 may represent the physical hardware systems/devices providing app server functionality and/or the application software resident in the cloud or at an edge compute node that performs server function(s). In some embodiments, the app/content server 138 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 110, 114. For example, the edge compute nodes can provide a connection between the RAN 114 and UPF in the 5GC 140. The edge compute nodes can use one or more NFV instances instantiated on virtualization infrastructure within the edge compute nodes to process wireless connections to and from the RAN 114 and a UPF.

In some implementations, the system 100 may include an SMSF, which is responsible for SMS subscription checking and verification, and relaying SM messages to/from the UE 102 to/from other entities, such as an SMS-GMSC/IWMSC/SMS-router. The SMS may also interact with AMF and UDM for a notification procedure that the UE 102 is available for SMS transfer (e.g., set a UE not reachable flag, and notifying UDM when UE 102 is available for SMS).

1. LTE and 5G/NR Rat Coexistence Embodiments

Embodiments herein are related to 5G/NR based access to licensed and unlicensed spectrum when 5G/NR and LTE or LTE-LAA RATs coexist when operated on the same frequency band and/or in the same component carriers (CCs). As alluded to previously, there are two types of signals in both LTE and 5G/NR including "physical channels and "physical signals." A physical channel corresponds to a set of REs carrying information originating from higher layers. Physical channels generally carry data and data-related signaling. For example, DL physical channels include PDSCH, PBCH, and PDCCH for both 5G/NR and LTE, among many others. A physical signal corresponds to a set of REs used by the PHY layer but does not carry information originating from higher layers. Physical channels generally carry reference signals (RSs), synchronization signals (SSs), and other signaling. For example, DL LTE RSs include CRS Multimedia Broadcast multicast service Single Frequency Network (MBSFN) RS, UE-specific RS (DMRS) associated with PDSCH, DMRS associated with EPDCCH or MPDCCH, Positioning RS (PRS), and CSI-RS. Additionally, DL 5G/NR RSs include DMRS, CSI-RS, Phase-tracking RS (PTRS), and PRS. A detailed discussion of the various LTE physical channels and physical signals are discussed in [T536211], and a detailed discussion of the various 5G/NR physical channels and physical signals are discussed in [T538211].

Both LTE and 5G/NR include mechanisms that provide coexistence for the physical channels of these two RATs such as, for example, error correction and the like. However, mechanisms do not currently exist for RS coexistence. Since RSs are the basis for channel estimation in LTE and 5G/NR, without properly receiving and decoding the RSs, the data reception is automatically degraded. This means that the collision of LTE and 5G/NR RSs can cause physical channel reception degradation because such collisions can negatively affect the ability for these RSs to be properly received and decoded. Although LTE and 5G/NR have built-in mechanisms to avoid intra-RAT physical signal collisions to avoid collision of RSs with other RSs or other physical signals within those RATs, neither technology includes inter-RAT coexistence mechanisms to avoid RS collisions.

For example, the LTE subframe 200 of FIG. 2 includes 14 OFDM symbols (labelled 0 to 13 in FIG. 2), and a 5G/NR slot also has 14 OFDM symbols similar to LTE subframe 200. Both the LTE subframe 200 and the 5G/NR slot have the same length, assuming that the LTE subframe 200 and the 5G/NR slot have the same SCS of 15 kHz. The LTE RAT always transmit the CRS in the slots shown by FIG. 2, which as mentioned previously, needs to be transmitted and received by the UE 102 for channel estimation. In deployments where LTE is superimposed on 5G/NR, and the 5G/NR system is not made aware of the existence of the LTE system, the 5G/NR system may transmit, for example, DMRSs in the same symbol as the transmitted CRS (e.g., symbols 0, 4, 7, and 11 in the time domain and at REs 2, 5, 8, 11 within a PRB in the frequency domain, as shown by FIG. 2). An inter-RAT RS collision occurs when, in this example, the DMRS and the CRS are transmitted in the same slot/symbol. When the inter-RAT RS collision occurs, the signal quality of both of RATs suffers.

Figure 3:
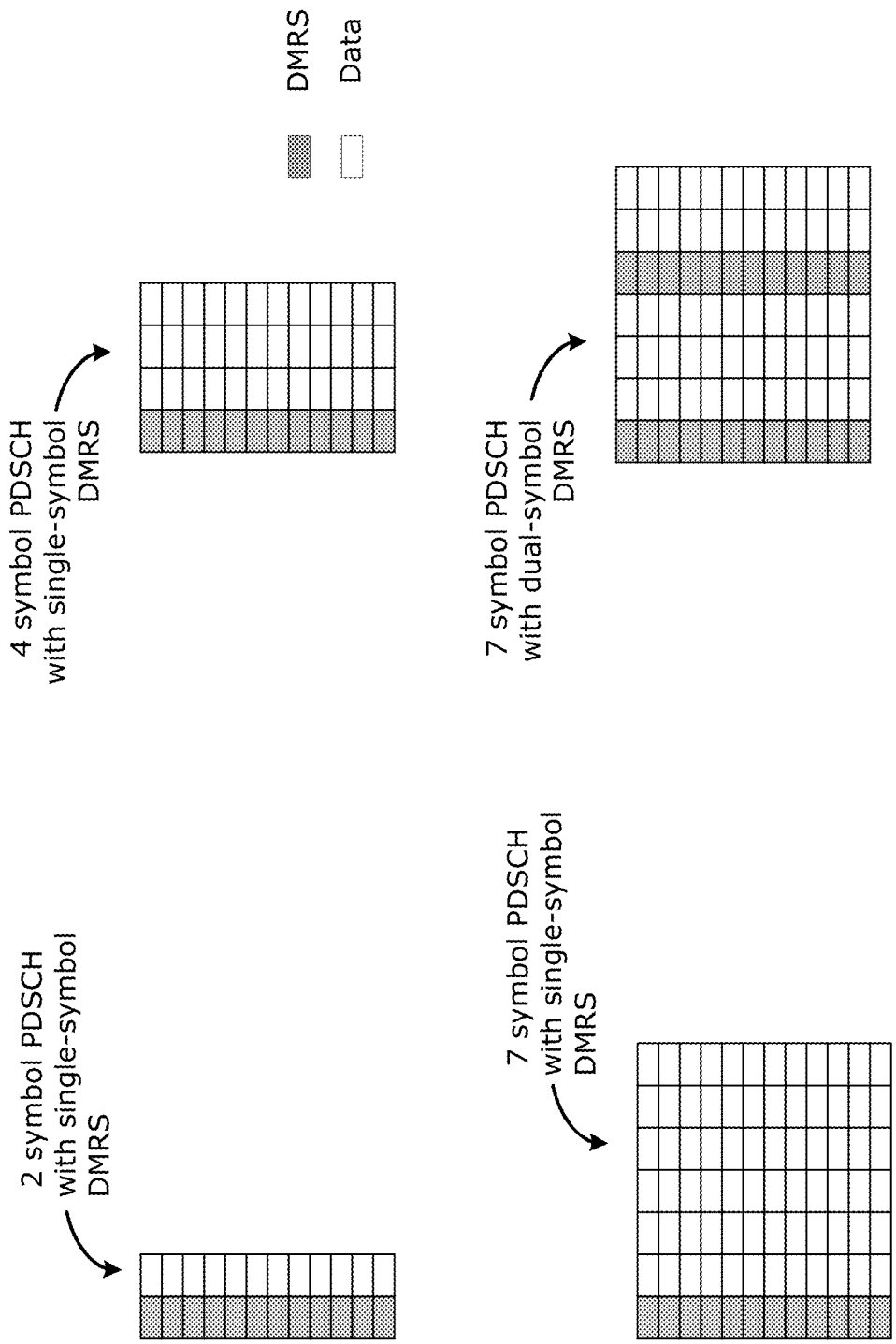
FIG. 3 illustrates an example of Demodulation Reference Signal (DMRS) positions for Physical Downlink Shared Channel (PDSCH) type B mapping.

FIG. 3 illustrates example DMRS positions for PDSCH mapping type B. The 3GPP RAN1 working group has agreed that 5G/NR based access to unlicensed spectrum PDSCH mapping Type B with a duration of 2-13 symbols will be supported in addition to the already specified durations of 2, 4 and 7 symbol DMRS in 5G/NR Release 15. As shown by FIG. 3, for single symbol DMRSs, a 2 symbol PDSCH has a DMRS position at symbol 0, a 4 symbol PDSCH has a DMRS position at symbol 0, and a 7 symbol PDSCH has a DMRS position at symbol 0 and possibly one additional DMRS at symbol 4. In 5G/NR Release 15, PDSCH mapping type B was defined so that only 2, 4 and 7 symbol PDSCH is permitted. Therefore, legacy DMRS positions were only defined for those cases shown by FIG. 2, namely, within the first slot (e.g., slot 0 in FIG. 2). Additionally, 5G/NR Release 15 defined DMRS positions for each of the PDSCHs. For example, if a two-symbol DMRS is aligned with the start of a slot (e.g., symbol 0 in FIG. 3), the DMRS will be the first symbol (e.g., symbol 0 in FIG. 3), and then that would collide with the CRS transmission in symbol 0. In other words, if the LTE subframe 200 of FIG. 2 were superimposed on to the PDSCH mapping scheme of FIG. 3, collisions would occur between the DMRS and CRS transmissions.

The embodiments herein provide different configurations for 5G/NR RS transmissions to avoid and/or prevent inter-RAT RS collisions with LTE RSs which could occur when, for example, 5G/NR and LTE subframes/slots are aligned. Here, the 5G/NR configurations for RS transmission may refer to PDSCH mapping types, and in particular, to different PDSCH mapping type B schemes. The embodiments herein are directed to various combinations of PDSCH mapping type lengths aligned and/or superimposed on to LTE subframes. In various embodiments, whenever an RS collision is detected, the 5G/NR RS (e.g., DMRS) is shifted to avoid the inter-RAT RS collision. Although the example embodiments discussed herein are described with respect to LTE CRS and 5G/NR DMRS, the embodiments herein could also be applied to other LTE and 5G/NR RSs, such as those mentioned herein.

In various embodiments, when a 5G/NR-capable UE 102 operating in an unlicensed band or in a licensed band is configured with higher-layer parameter lte-CRS-ToMatchAround within a ServingCellConfig information element (IE) where one or multiple LTE CRS patterns in one or more CCs which overlap fully or partially with one or more 5G/NR CCs are indicated using the RRC configuration RateMatchPatternLTE-CRS IE, the 5G/NR-capable UE 102 uses the DMRS locations discussed infra to avoid collision of DMRS symbols with LTE CRS symbols.

The ServingCellConfig IE is used to configure (e.g., add or modify) the UE 102 with a serving cell, which may be an SpCell or an SCell of an MCG or SCG. The parameters herein are mostly UE-specific but partly also cell specific (e.g., in additionally configured BWPs). An example ServingCellConfig IE and related field descriptions are shown by Table 1a and Table 1b, respectively. The RateMatchPatternLTE-CRS IE is used to configure a pattern to rate match around LTE CRS (see e.g., [TS38214], clause 5.1.4.2). An example RateMatchPatternLTE-CRS IE and related field descriptions are shown by Table 2a Table 1a and Table 2b, respectively.

TABLE 1a

ServingCellConfig information element

```
-- ASN1START
-- TAG-SERVINGCELLCONFIG-START
ServingCellConfig ::=                 SEQUENCE {
    tdd-UL-DL-ConfigurationDedicated  TDD-UL-DL-ConfigDedicated
    OPTIONAL,   -- Cond TDD
    initialDownlinkBWP                BWP-DownlinkDedicated
    OPTIONAL,   -- Need M
    downlinkBWP-ToReleaseList         SEQUENCE (SIZE (1..maxNrofBWPs)) OF BWP-Id
    OPTIONAL,   -- Need N
    downlinkBWP-ToAddModList          SEQUENCE (SIZE (1..maxNrofBWPs)) OF BWP-Downlink
    OPTIONAL,   -- Need N
    firstActiveDownlinkBWP-Id         BWP-Id
    OPTIONAL, -- Cond SyncAndCellAdd
    bwp-InactivityTimer               ENUMERATED {ms2, ms3, ms4, ms5, ms6, ms8, ms10, ms20, ms30,
                                          ms40,ms50, ms60, ms80,ms100, ms200,ms300, ms500,
                                          ms750, ms1280, ms1920, ms2560, spare10, spare9, spare8,
                                          spare7, spare6, spare5, spare4, spare3, spare2, spare1 }    OPTIONAL,  --Need R
    defaultDownlinkBWP-Id             BWP-Id
```

TABLE 1a-continued

ServingCellConfig information element

```
        OPTIONAL,       -- Need S
    uplinkConfig                        UplinkConfig
        OPTIONAL,       -- Need M
    supplementaryUplink                 UplinkConfig
        OPTIONAL,       -- Need M
    pdcch-ServingCellConfig             SetupRelease { PDCCH-ServingCellConfig }
        OPTIONAL,       -- Need M
    pdsch-ServingCellConfig             SetupRelease { PDSCH-ServingCellConfig }
        OPTIONAL,       -- Need M
    csi-MeasConfig                      SetupRelease { CSI-MeasConfig }
        OPTIONAL,       -- Need M
    sCellDeactivationTimer              ENUMERATED {ms20, ms40, ms80, ms160, ms200, ms240,
                                                    ms320, ms400, ms480, ms520, ms640, ms720,
                                                    ms840, ms1280, spare2,spare1}      OPTIONAL, --
    Cond ServingCellWithoutPUCCH
    crossCarrierSchedulingConfig        CrossCarrierSchedulingConfig
        OPTIONAL,       -- Need M
    tag-Id                              TAG-Id,
    dummy                               ENUMERATED {enabled}
        OPTIONAL,       -- Need R
    pathlossReferenceLinking            ENUMERATED {spCell, sCell}
        OPTIONAL,       -- Cond SCellOnly
    servingCellMO                       MeasObjectId
        OPTIONAL,       -- Cond MeasObject
    ...,
    [[
    lte-CRS-ToMatchAround               SetupRelease { RateMatchPatternLTE-CRS }
        OPTIONAL,       -- Need M
    rateMatchPatternToAddModList        SEQUENCE (SIZE (1..maxNrofRateMatchPatterns)) OF
    RateMatchPattern        OPTIONAL,       -- Need N
    rateMatchPatternToReleaseList SEQUENCE (SIZE (1..maxNrofRateMatchPatterns)) OF
    RateMatchPatternId      OPTIONAL,       -- Need N
    downlinkChannelBW-PerSCS-List       SEQUENCE (SIZE (1..maxSCSs)) OF SCS-SpecificCarrier
    OPTIONAL       -- Need S
    ]],
    [[
    supplementaryUplinkRelease          ENUMERATED {true}
        OPTIONAL,       -- Need N
    tdd-UL-DL-ConfigurationDedicated-iab-mt-r16     TDD-UL-DL-ConfigDedicated-IAB-MT-r16
        OPTIONAL,       -- Cond TDD_IAB
    dormantBWP-Config-r16               SetupRelease { DormantBWP-Config-r16 }
        OPTIONAL,       -- Need M
    ca-SlotOffset-r16                   CHOICE {
        refSCS15kHz                         INTEGER (-2..2),
        refSCS30KHz                         INTEGER (-5..5),
        refSCS60KHz                         INTEGER (-10..10),
        refSCS120KHz                        INTEGER (-20..20)
    }
        OPTIONAL,       -- Cond AsyncCA
    channelAccessConfig-r16             SetupRelease { ChannelAccessConfig-r16 }
        OPTIONAL,       -- Need M
    intraCellGuardBandsUL-r16           IntraCellGuardBands-r16
        OPTIONAL,       -- Need S
    intraCellGuardBandsDL-r16           IntraCellGuardBands-r16
        OPTIONAL,       -- Need S
    csi-RS-ValidationWith-DCI-r16       ENUMERATED {enabled}
        OPTIONAL,       -- Need R
    lte-CRS-PatternList1-r16            SetupRelease { LTE-CRS-PatternList-r16 }
        OPTIONAL,       -- Need M
    lte-CRS-PatternList2-r16            SetupRelease { LTE-CRS-PatternList-r16 }
        OPTIONAL,       -- Need M
    crs-RateMatch-PerCORESETPoolIndex-r16   ENUMERATED {enabled}
        OPTIONAL,       -- Need R
    enableTwoDefaultTCIStates-r16       ENUMERATED {enabled}
        OPTIONAL,       -- Need R
    enableDefaultTCIStatePerCoresetPoolIndex-r16    ENUMERATED {enabled}
        OPTIONAL,       -- Need R
    enableBeamSwitchTiming-r16          ENUMERATED {true}
        OPTIONAL,       -- Need R
    cbg-TxDiffTBsProcessingType1-r16    ENUMERATED {enabled}
        OPTIONAL,       -- Need R
    cbg-TxDiffTBsProcessingType2-r16    ENUMERATED {enabled}
    OPTIONAL        -- Need R
    ]]
}
```

TABLE 1a-continued

ServingCellConfig information element

```
UplinkConfig ::=                        SEQUENCE {
    initialUplinkBWP                    BWP-UplinkDedicated             OPTIONAL,   -- Need M
    uplinkBWP-ToReleaseList             SEQUENCE (SIZE (1..maxNrofBWPs)) OF BWP-Id   OPTIONAL,   -- Need N
    uplinkBWP-ToAddModList              SEQUENCE (SIZE (1..maxNrofBWPs)) OF BWP-Uplink   OPTIONAL,   -- Need N
    firstActiveUplinkBWP-Id             BWP-Id                          OPTIONAL,   -- Cond SyncAndCellAdd
    pusch-ServingCellConfig             SetupRelease { PUSCH-ServingCellConfig }   OPTIONAL,   -- Need M
    carrierSwitching                    SetupRelease { SRS-CarrierSwitching }   OPTIONAL,   -- Need M
    ...,
    [[
    powerBoostPi2BPSK                   BOOLEAN                         OPTIONAL,   -- Need M
    uplinkChannelBW-PerSCS-List         SEQUENCE (SIZE (1..maxSCSs)) OF SCS-SpecificCarrier   OPTIONAL   -- Need S
    ]],
    [[
    enablePLRS-UpdateForPUSCH-SRS-r16   ENUMERATED {enabled}            OPTIONAL,   -- Need R
    enableDefaultBeamPL-ForPUSCH0-r16   ENUMERATED {enabled}            OPTIONAL,   -- Need R
    enableDefaultBeamPL-ForPUCCH-r16    ENUMERATED {enabled}            OPTIONAL,   -- Need R
    enableDefaultBeamPL-ForSRS-r16      ENUMERATED {enabled}            OPTIONAL,   -- Need R
    uplinkTxSwitching-r16               SetupRelease { UplinkTxSwitching-r16 }   OPTIONAL,   -- Need M
    ]]
}
ChannelAccessConfig-r16 ::=             SEQUENCE {
    maxEnergyDetectionThreshold-r16         INTEGER(-85..-52),
    energyDetectionThresholdOffset-r16      INTEGER (-20..-13),
    ul-toDL-COT-SharingED-Threshold-r16     INTEGER (-85..-52)   OPTIONAL,   -- Need R
    absenceOfAnyOtherTechnology-r16         ENUMERATED {true}    OPTIONAL   -- Need R
}
IntraCellGuardBands-r16 ::=             SEQUENCE (SIZE (1..4)) OF GuardBand-r16
GuardBand-r16 ::=                       SEQUENCE {
    startCRB-r16                        INTEGER (0..274),
    nrofCRB5-r16                        INTEGER (0..15)
}
DormancyGroupID-r16 ::=         INTEGER (0..4)
DormantBWP-Config-r16 ::=               SEQUENCE {
    dormantBWP-Id-r16                   BWP-Id                          OPTIONAL,   -- Need M
    withinActiveTimeConfig-r16          SetupRelease { WithinActiveTimeConfig-r16 }   OPTIONAL,   -- Need M
    outsideActiveTimeConfig-r16         SetupRelease { OutsideActiveTimeConfig-r16 }   OPTIONAL   -- Need M
}
WithinActiveTimeConfig-r16 ::=          SEQUENCE {
    firstWithinActiveTimeBWP-Id-r16     BWP-Id                          OPTIONAL,   -- Need M
    dormancyGroupWithinActiveTime-r16   DormancyGroupID-r16             OPTIONAL   -- Need R
}
OutsideActiveTimeConfig-r16 ::=         SEQUENCE {
    firstOutsideActiveTimeBWP-Id-r16    BWP-Id                          OPTIONAL,   -- Need M
    dormancyGroupOutsideActiveTime-r16  DormancyGroupID-r16             OPTIONAL   -- Need R
}
UplinkTxSwitching-r16 ::=               SEQUENCE {
    uplinkTxSwitchingPeriodLocation-r16 BOOLEAN,
    uplinkTxSwitchingCarrier-r16        ENUMERATED {carrier1, carrier2}
}
-- TAG-SERVINGCELLCONFIG-STOP
-- ASN1STOP
```

TABLE 1b

ServingCellConfig field descriptions absenceOfAnyOtherTechnology
Presence of this field indicates absence on a long term basis (e.g. by level of regulation) of any other technology sharing the carrier; absence of this field indicates the potential presence of any other technology sharing the carrier, as specified in 3GPP TS 37.213, clause Y.
bwp-InactivityTimer
The duration in ms after which the UE falls back to the default Bandwidth Part (see 3GPP TS 38.321, clause 5.15). When the network releases the timer configuration, the UE stops the timer without switching to the default BWP.
ca-SlotOffset
Slot offset between the primary cell (PCell/PSCell) and the SCell in unaligned frame boundary with slot alignment and partial SFN alignment inter-band CA. Based on this field, the UE determines the time offset of the SCell as specified in clause 4.5 of [TS38211]. The granularity of this field is determined by the reference SCS for the slot offset (i.e. the maximum of PCell/PSCell lowest SCS among all the configured SCSs in DL/UL SCS-SpecificCarrierList in ServingCellConfig and this serving cell's lowest SCS among all the configured SCSs in DL/UL SCS-SpecificCarrierList in ServingCellConfig).
The Network configures at most single non-zero offset duration in ms (independent on SCS) among CCs in the unaligned CA configuration. If the field is absent, the UE applies the value of 0.
cbg-TxDiffTBsProcessingType1, cbg-TxDiffTBsProcessingType2
Indicates whether processing types 1 and 2 based CBG based operation is enabled according to Rel-16 UE capabilities.
channelAccessConfig
List of parameters used for access procedures of operation with shared spectrum channel access (see 3GPP TS 37.213).
crossCarrierSchedulingConfig
Indicates whether this serving cell is cross-carrier scheduled by another serving cell or whether it cross-carrier schedules another serving cell.
csi-RS-ValidationWith-DCI
Determines how the UE performs periodic and semi-persistent CSI-RS reception in a slot if the UE does not detect a DCI format indicating aperiodic CSI-RS or PDSCH in the set of symbols (see [TS38213], clause 11.1).
crs-RateMatch-PerCORESETPoolIndex
Indicates how UE performs rate matching when both lte-CRS-PatternList1-r16 and lte-CRS-PatternList2-r16 are configured as specified in TS 38.314, clause 5.1.4.2.
defaultDownlinkBWP-Id
The initial bandwidth part is referred to by BWP-Id = 0. ID of the downlink bandwidth part to be used upon expiry of the BWP inactivity timer. This field is UE specific. When the field is absent the UE uses the initial BWP as default BWP. (see [TS38213], clause 12 and 3GPP TS 38.321, clause 5.15).
dormantBWP-Config
The dormant BWP configuration for an SCell. This field can be included only for a (non-PUCCH) SCell.
downlinkBWP-ToAddModList
List of additional downlink bandwidth parts to be added or modified. (see [TS38213]], clause 12).
downlinkBWP-ToReleaseList
List of additional downlink bandwidth parts to be released. (see [TS38213], clause 12).
downlinkChannelBW-PerSCS-List
A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in scs-SpecificCarrierList in DownlinkConfigCommon/DownlinkConfigCommonSIB. Network only configures channel bandwidth that corresponds to the channel bandwidth values defined in 3GPP TS 38.101-1 and TS 38.101-2.
enableBeamSwitchTiming
Indicates the aperiodic CSI-RS triggering with beam switching triggering behaviour as defined in clause 5.2.1.5.1 of [TS38214].
enableDefaultTCIStatePerCoresetPoolIndex
Presence of this field indicates the UE shall follow the release 16 behavior of default TCI state per CORESETPoolindex when the UE is configured by higher layer parameter PDCCH-Config that contains two different values of CORESETPoolIndex in ControlResourceSet is enabled.
enableTwoDefaultTCIStates
Presence of this field indicates the UE shall follow the release 16 behavior of two default TCI states for PDSCH when at least one TCI codepoint is mapped to two TCI states is enabled
energyDetectionThresholdOffset
Indicates the offset to the default maximum energy detection threshold value. Unit in dB. Value −13 corresponds to −13dB, value −12 corresponds to −12dB, and so on (i.e. in steps of 1dB) as specified in 3GPP TS 37.213.
firstActiveDownlinkBWP-Id
If configured for an SpCell, this field contains the ID of the DL BWP to be activated upon performing the RRC (re-)configuration. If the field is absent, the RRC (re-)configuration does not impose a BWP switch.
If configured for an SCell, this field contains the ID of the downlink bandwidth part to be used upon activation of an SCell. The initial bandwidth part is referred to by BWP-Id = 0.
Upon PCell change and PSCell addition/change, the network sets the firstActiveDownlinkBWP-Id and firstActiveUplinkBWP-Id to the same value.
initialDownlinkBWP
The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured.
NOTE1
intraCellGuardBandsDL, intraCellGuardBandsUL
List of intra-cell guard bands in a serving cell. For each entry in the list, startCRB indicates the starting RB of the guard band and nrofCRBs indicates the length of the guard band in RBs. For intraCellGuardBandsUL, when nrofCRBs is 0, zero-size or no guard band is used. If not configured, the guard bands are defined according the 3GPP TS 38.104 and 3GPP TS 38.101-1.

TABLE 1b-continued

ServingCellConfig field descriptions lte-CRS-PatternList
A list of LTE CRS patterns around which the UE shall do rate matching for PDSCH. The LTE CRS patterns in this list shall be non-overlapping in frequency. The network does not configure this field and lte-CRS-ToMatchAround simultaneously.
lte-CRS-PatternList2
A list of LTE CRS patterns around which the UE shall do rate matching for PDSCH scheduled with a DCI detected on a CORESET with CORESETPoolIndex configured with 1. This list is configured only if CORESETPoolIndex configured with 1. The first LTE CRS pattern in this list shall be fully overlapping in frequency with the first LTE CRS pattern in lte-CRS-PatternList, The second LTE CRS pattern in this list shall be fully overlapping in frequency with the second LTE CRS pattern in lte-CRS-PatternList, and so on. Network configures this field only if the field lte-CRS-ToMatchAround is not configured and there is at least one ControlResourceSet in one DL BWP of this serving cell with coresetPoolIndex set to 1.
lte-CRS-ToMatchAround
Parameters to determine an LTE CRS pattern that the UE shall rate match around.
maxEnergyDetectionThreshold
Indicates the absolute maximum energy detection threshold value. Unit in dBm. Value −85 corresponds to −85 dBm, value −84 corresponds to −84 dBm, and so on (i.e. in steps of 1dBm) as specified in 3GPP TS 37.213. If the field is not configured, the UE shall use a default maximum energy detection threshold value as specified in 3GPP TS 37.213.
pathlossReferenceLinking
Indicates whether UE shall apply as pathloss reference either the downlink of SpCell (PCell for MCG or PSCell for SCG) or of SCell that corresponds with this uplink (see [TS38213], clause 7).
pdsch-ServingCellConfig
PDSCH related parameters that are not BWP-specific.
rateMatchPatternToAddModList
Resources patterns which the UE should rate match PDSCH around. The UE rate matches around the union of all resources indicated in the rate match patterns. Rate match patterns defined here on cell level apply only to PDSCH of the same numerology. See TS 38.214 [19], clause 5.1.2.2.3.
sCellDeactivationTimer
SCell deactivation timer in 3GPP TS 38.321. If the field is absent, the UE applies the value infinity.
servingCellMO
measObjectId of the MeasObjectNR in MeasConfig which is associated to the serving cell. For this MeasObjectNR, the following relationship applies between this MeasObjectNR and frequencyInfoDL in ServingCellConfigCommon of the serving cell: if ssbFrequency is configured, its value is the same as the absoluteFrequencySSB and if csi-rs-ResourceConfigMobility is configured, the value of its subcarrierSpacing is present in one entry of the scs-SpecificCarrierList, csi-RS-CellListMobility includes an entry corresponding to the serving cell (with cellId equal to physCellId in ServingCellConfigCommon) and the frequency range indicated by the csi-rs-MeasurementBW of the entry in csi-RS-CellListMobility is included in the frequency range indicated by in the entry of the scs-SpecificCarrierList.
supplementaryUplink
Network may configure this field only when supplementaryUplinkConfig is configured in ServingCellConfigCommon or ServingCellConfigCommonSIB.
supplementaryUplinkRelease
If this field is included, the UE shall release the uplink configuration configured by supplementaryUplink. The network only includes either supplementaryUplinkRelease or supplementaryUplink at a time.
tag-Id
Timing Advance Group ID, as specified in 3GPP TS 38.321, which this cell belongs to.
tdd-UL-DL-ConfigurationDedicated-iab-mt
Resource configuration per IAB-MT D/U/F overrides all symbols (with a limitation that effectively only flexible symbols can be overwritten in Rel-16) per slot over the number of slots as provided by TDD-UL-DL-ConfigurationCommon.
ul-toDL-COT-SharingED-Threshold
Maximum energy detection threshold that the UE should use to share channel occupancy with gNB for DL transmission with length no longer than 2, 4, and 8 OFDM symbols for 15Khz, 30Khz, 60KHz SCS respectively, as specified in TS 37.213 [48].
uplinkConfig
Network may configure this field only when uplinkConfigCommon is configured in ServingCellConfigCommon or ServingCellConfigCommonSIB. Addition or release of this field can only be done upon SCell addition or release (respectively).

TABLE 2a

RateMatchPatternLTE-CRS information element

```
-- ASN1START
-- TAG-RATEMATCHPATTERNLTE-CRS-START
RateMatchPatternLTE-CRS ::=         SEQUENCE {
    carrierFreqDL                   INTEGER (0..16383),
    carrierBandwidthDL              ENUMERATED {n6, n15, n25, n50, n75, n100, spare2,
spare1},
    mbsfn-SubframeConfigList        EUTRA-MBSFN-SubframeConfigList
OPTIONAL,    -- Need M
    nrofCRS-Ports                   ENUMERATED {n1, n2, n4},
    v-Shift                         ENUMERATED {n0, n1, n2, n3, n4, n5}
}
```

TABLE 2a-continued

RateMatchPatternLTE-CRS information element

LTE-CRS-PatternList-r16 : : =     SEQUENCE (SIZE (1..maxLTE-CRS-Patterns-r16)) OF
RateMatchPatternLTE-CRS
-- TAG-RATEMATCHPATTERNLTE-CRS-STOP
-- ASN1STOP TABLE 2b RateMatchPatternLTE-CRS field descriptions
RateMatchPatternLTE-CRS field descriptions carrierBandwidthDL
BW of the LTE carrier in number of PRBs (see [TS38214], clause 5.1.4.2).
carrierFreqDL
Center of the LTE carrier (see [TS38214], clause 5.1.4.2).
mbsfn-SubframeConfigList
LTE MBSFN subframe configuration (see [T538214], clause 5.1.4.2).
nrofCRS-Ports
Number of LTE CRS antenna port to rate-match around (see [T538214], clause 5.1.4.2).
v-Shift
Shifting value v-shift in LTE to rate match around LTE CRS (see [T538214], clause 5.1.4.2).

1.1 Front-Loaded DDMRS with No Additional DMRS

In some embodiments, the PDSCH Mapping Type B scheme only includes front-loaded DMRS and no additional DMRSs. In one embodiment, for 2 symbol PDSCH (e.g., the PDSCH duration $l_d=2$), the DMRS position is symbol 0 or symbol 2. In another embodiment, for 3 symbol PDSCH (e.g., the PDSCH duration $l_d=3$), the DMRS position is symbol 0 or symbol 2. In another embodiment, for 4 symbol PDSCH (e.g., the PDSCH duration $l_d=4$), the DMRS position is symbol 0 or symbol 2.

1.2. Front-Loaded DMRS with One or More Additional DMRS

In some embodiments, the PDSCH Mapping Type B scheme includes front-loaded DMRS and one or more additional DMRSs. Examples of such embodiments are shown by FIGS. 4A, 4B, 5A, 5B, 6A, and 6B.

Figure 4A:
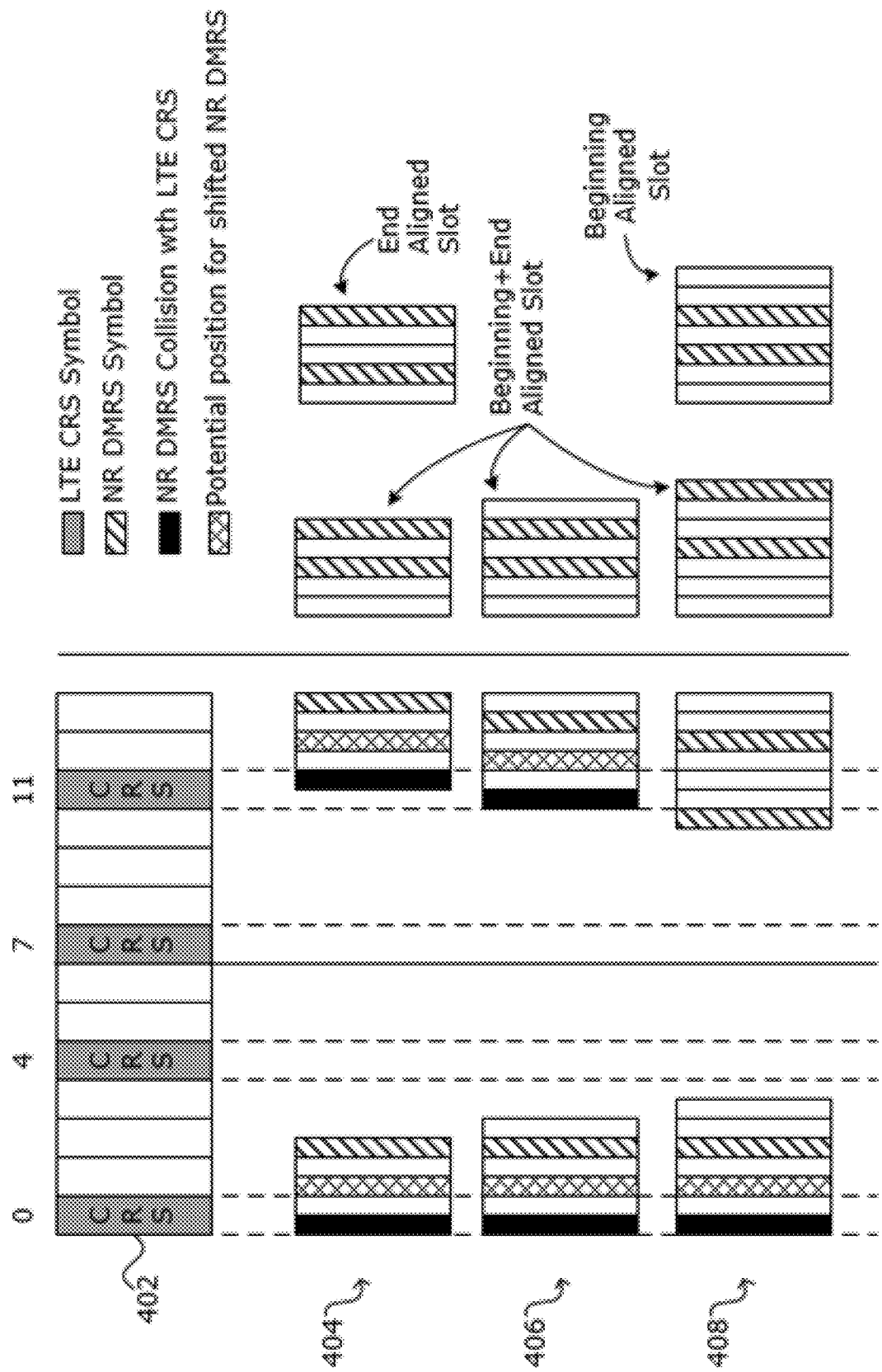
FIGS. 4A, 4B 5A, 5B, 6A, and 6B illustrate an example PDSCH Mapping Type B schemes, according to various embodiments.
Figure 4B:
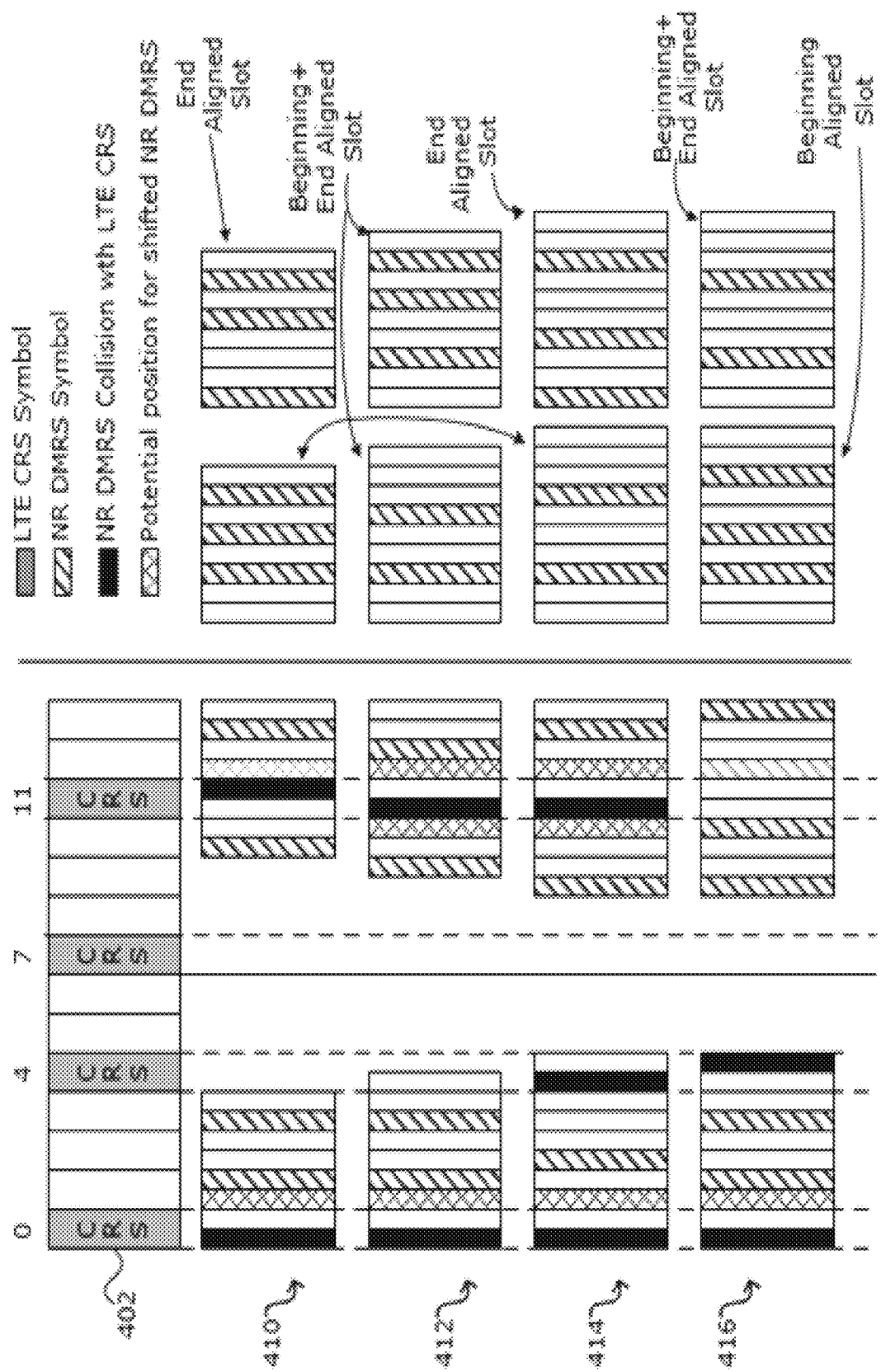

FIGS. 4A and 4B illustrates an example PDSCH Mapping Type B scheme with lengths of 5-10 symbols, according to various embodiments. In the example of FIGS. 4A and 4B, LTE CRS Pattern 402 includes an SCS of 15 kHz, and the NR Type B DMRS has an SCS of 30 kHz.

FIG. 4A shows an example PDSCH Mapping Type B scheme for PDSCH durations ($l_d$) of 5, 6, and 7, which is aligned with an LTE CRS pattern 402. NR-DMRS Type B mapping 404 shows a 5 symbol PDSCH ($l_d=5$) where NR-DMRSs are transmitted in the position of the first NR-DMRS symbol ($l_0$) and the fifth symbol (e.g., symbol 4) (e.g., DMRS: $\{l_0, 4\}$). NR-DMRS Type B mapping 406 shows a 6 symbol PDSCH ($l_d=6$) where NR-DMRSs are transmitted in the position of the first NR-DMRS symbol ($l_0$) and the fifth symbol (e.g., symbol 4) (e.g., DMRS: $\{l_0, 4\}$). NR-DMRS Type B mapping 408 shows a 7 symbol PDSCH ($l_d=7$) where NR-DMRSs are transmitted in the position of the first NR-DMRS symbol ($l_0$) and the fifth symbol (e.g., symbol 4) (e.g., DMRS: $\{l_0, 4\}$).

In each of the mappings 404, 406, and 408, a first inter-RAT RS collision takes place due to an NR-DMRS transmitted at NR-DMRS symbol $l_0$ in a first slot colliding with the LTE CRS transmitted in symbol 0 of the LTE subframe 402. In each of the mappings 404 and 406, a second inter-RAT RS collision takes place due to an NR-DMRS transmitted at NR-DMRS symbol ($l_0$) in a second slot colliding with the LTE CRS transmitted in symbol 11 of the LTE subframe 402.

In one embodiment for 5 symbol PDSCH ($l_d=5$), the DMRS position is shifted to symbol 2 and possibly one additional DMRS at symbol 4. This pattern may be used when the PDSCH Mapping Type B slot boundaries are aligned with the beginning and end of the LTE CRS pattern 402.

In another embodiment for 5 symbol PDSCH ($l_d=5$), the DMRS position is shifted to symbol 1 and possibly one additional DMRS at symbol 4 for the case when the PDSCH Mapping Type B slot boundary is aligned with the end of the LTE CRS pattern 402.

In one embodiment for 6 symbol PDSCH ($l_d=6$), the DMRS position is shifted to symbol 3 and possibly one additional DMRS at symbol 4. In another embodiment for 6 symbol PDSCH ($l_d=6$), the DMRS position is shifted to symbol 2 and possibly one additional DMRS at symbol 4. In another embodiment for 6 symbol PDSCH ($l_d=6$), the DMRS position is shifted to symbol 0 and possibly one additional DMRS at symbol 4. These embodiments may be used for the case when the PDSCH Mapping Type B slot boundaries are aligned with the beginning and end of the LTE CRS pattern 402.

In one embodiment for 7 symbol PDSCH ($l_d=7$), the DMRS position is shifted to symbol 3 and possibly one additional DMRS at symbol 6. This embodiment may be used for the case when the PDSCH Mapping Type B slot boundaries are aligned with the beginning and end of the LTE CRS pattern 402.

In another embodiment for 7 symbol PDSCH ($l_d=7$), the DMRS position is shifted to symbol 2 and possibly one additional DMRS at symbol 4 for the case when the PDSCH Mapping Type B slot boundary is aligned with the beginning of the LTE subframe/CRS pattern 402.

In another embodiment for 7 symbol PDSCH ($l_d=7$), the DMRS position is shifted to symbol 2 and possibly one additional DMRS at symbol 5 for the case when the PDSCH Mapping Type B slot boundary is aligned with the beginning of the LTE subframe/CRS pattern 402.

In another embodiment for 7 symbol PDSCH ($l_d$=7), the DMRS position is shifted to symbol 0 and possibly one additional DMRS at symbol 5 for the case when the PDSCH Mapping Type B slot boundary is aligned with the beginning of the LTE subframe/CRS pattern 402.

In another embodiment for 7 symbol PDSCH ($l_d$=7), the DMRS position is shifted to symbol 0 and possibly one additional DMRS at symbol 4 for the case when the PDSCH Type B Mapping slot boundary is aligned with the beginning of the LTE subframe/CRS pattern 402.

FIG. 4B shows an example PDSCH Mapping Type B scheme for PDSCH durations ($l_d$) of 8, 9, and 10, which is aligned with the LTE CRS pattern 402. NR-DMRS Type B mapping 410 shows an 8 symbol PDSCH ($l_d$=8) where NR-DMRSs are transmitted in the position of the first NR-DMRS symbol ($l_0$), the fourth symbol (e.g., symbol 3), and the seventh symbol (e.g., symbol 6). (e.g., DMRS: {$l_0$, 3, 6}). NR-DMRS Type B mapping 412 shows a 9 symbol PDSCH ($l_d$=9) where NR-DMRSs are transmitted in the position of the first NR-DMRS symbol ($l_0$), the fourth symbol (e.g., symbol 3), and the seventh symbol (e.g., symbol 6). (e.g., DMRS: {$l_0$, 3, 6}).

In each of the mappings 410 and 412, a first inter-RAT RS collision takes place due to an NR-DMRS transmitted at NR-DMRS symbol $l_0$ in a first slot colliding with the LTE CRS transmitted in symbol 0 of the LTE subframe 402. In mappings 410 and 412, a second inter-RAT RS collision takes place due to an NR-DMRS transmitted at NR-DMRS symbol 3 in a second slot colliding with the LTE CRS transmitted in symbol 11 of the LTE subframe 402.

NR-DMRS Type B mapping 414 shows a 10 symbol PDSCH ($l_d$=10) where NR-DMRSs are transmitted in the position of the first NR-DMRS symbol ($l_0$), the fifth symbol (e.g., symbol 4), and the ninth symbol (e.g., symbol 8) (e.g., DMRS: {$l_0$, 4, 8}), where collisions take place at symbol $l_0$ and symbol 8. NR-DMRS Type B mapping 416 shows a 10 symbol PDSCH ($l_d$=10) where NR-DMRSs are transmitted in the position of the first NR-DMRS symbol ($l_0$), the fourth symbol (e.g., symbol 3), and the seventh symbol (e.g., symbol 6). (e.g., DMRS: {$l_0$, 3, 6, 9}) where collisions take place at symbol $l_0$ and symbol 9.

In one embodiment for 8 symbol PDSCH ($l_d$=8), the DMRS position is shifted to symbol 2 and possibly two additional DMRSs can be configured. If one additional DMRS is configured, then the additional DMRS position is symbol 6. If two additional DMRSs are configured, then the additional DMRS positions are symbol 4 and symbol 6.

In one 8 symbol PDSCH ($l_d$=8) embodiment where the PDSCH mapping type B slot boundary is aligned with the end of the LTE subframe 402, the DMRS position is symbol 0 and possibly two additional DMRSs can be configured. If one additional DMRS is configured, then the additional DMRS position is symbol 6. If two additional DMRSs are configured, then the additional DMRS positions are symbol 4 and symbol 6.

In one 8 symbol PDSCH ($l_d$=8) embodiment where PDSCH mapping type B slot boundary is aligned with the end of the LTE subframe 402, the DMRS position is symbol 0 and possibly up to two additional DMRSs can be configured. If one additional DMRS is configured then the additional DMRS position is symbol 6. If two additional DMRSs are configured then the additional DMRS positions are symbol 4 and symbol 6.

In one embodiment for 9 symbol PDSCH ($l_d$=9), the DMRS position is shifted to symbol 2 and possibly two additional DMRSs can be configured. If one additional DMRS is configured, then the additional DMRS position is symbol 6. If two additional DMRSs are configured, then the additional DMRS positions are symbol 5 and symbol 7. In another embodiment for 9 symbol PDSCH ($l_d$=9), if two additional DMRSs are configured, then only one additional DMRS is transmitted in symbol 5.

In one 9 symbol PDSCH ($l_d$=9) embodiment where the PDSCH mapping type B slot boundary is aligned with the end of the LTE subframe 402, the DMRS position is symbol 0 and possibly up to two additional DMRSs can be configured. If one additional DMRS is configured, then the additional DMRS position is symbol 6. If two additional DMRSs are configured, then the additional DMRS positions are symbol 2 and symbol 6.

In another 9 symbol PDSCH ($l_d$=9) embodiment where the PDSCH mapping type B slot boundary is aligned with the end of the LTE subframe 402, the DMRS position is symbol 0 and possibly up to two additional DMRSs can be configured. If one additional DMRS is configured then the additional DMRS position is symbol 7. If two additional DMRSs are configured then the additional DMRS positions are symbol 5 and symbol 7.

In one embodiment for 10 symbol PDSCH ($l_d$=10), the DMRS position is shifted to symbol 2 and possibly three additional DMRSs can be configured. If one additional DMRS is configured, then the additional DMRS position is symbol 7. If two additional DMRSs are configured, then only a single additional DMRS at symbol 6 is transmitted. If three additional DMRSs are configured, then only a single additional DMRS at symbol 6 is transmitted.

In one 10 symbol PDSCH ($l_d$=10) embodiment where the PDSCH mapping type B slot boundary is aligned with the end of the LTE subframe 402, the DMRS position is symbol 0 and possibly up to three additional DMRSs can be configured. If one additional DMRS is configured, then the additional DMRS position is symbol 8. If two additional DMRSs are configured, then the DMRS positions are symbol 3 and symbol 7. If three additional DMRSs are configured, then the DMRS positions are symbol 3, symbol 6, and symbol 9.

In another 10 symbol PDSCH ($l_d$=10) embodiment where the PDSCH mapping type B slot boundary is aligned with the end of the LTE subframe 402, the DMRS position is symbol 0 and possibly up to three additional DMRSs can be configured. If one additional DMRS is configured, the additional DMRS position is symbol 8. If two additional DMRSs are configured, the DMRS positions are symbol 6 and symbol 8. If three additional DMRSs are configured, the DMRS positions are symbol 2, symbol 6, and symbol 9.

In another 10 symbol PDSCH ($l_d$=10) embodiment where the PDSCH mapping type B slot boundary is aligned with the end of the LTE subframe 402, the DMRS position is symbol 1 and possibly up to three additional DMRSs can be configured. If one additional DMRS is configured, the additional DMRS position is symbol 8. If two additional DMRSs are configured, then the DMRS positions are symbol 6 and symbol 8. If three additional DMRSs are configured, then only two additional DMRS positions are symbol 5 and symbol 8.

In another 10 symbol PDSCH ($l_d$=10) embodiment where the PDSCH mapping type B slot boundary is aligned with the beginning of the LTE subframe 402, the DMRS position is symbol 2 and possibly up to three additional DMRSs can be configured. If one additional DMRS is configured, the additional DMRS position is symbol 7. If two additional DMRSs are configured, the DMRS positions are symbol 4 and symbol 7. If three additional DMRSs are configured, then only two additional DMRSs are transmitted from symbol 4 and symbol 7.

Figure 5A:
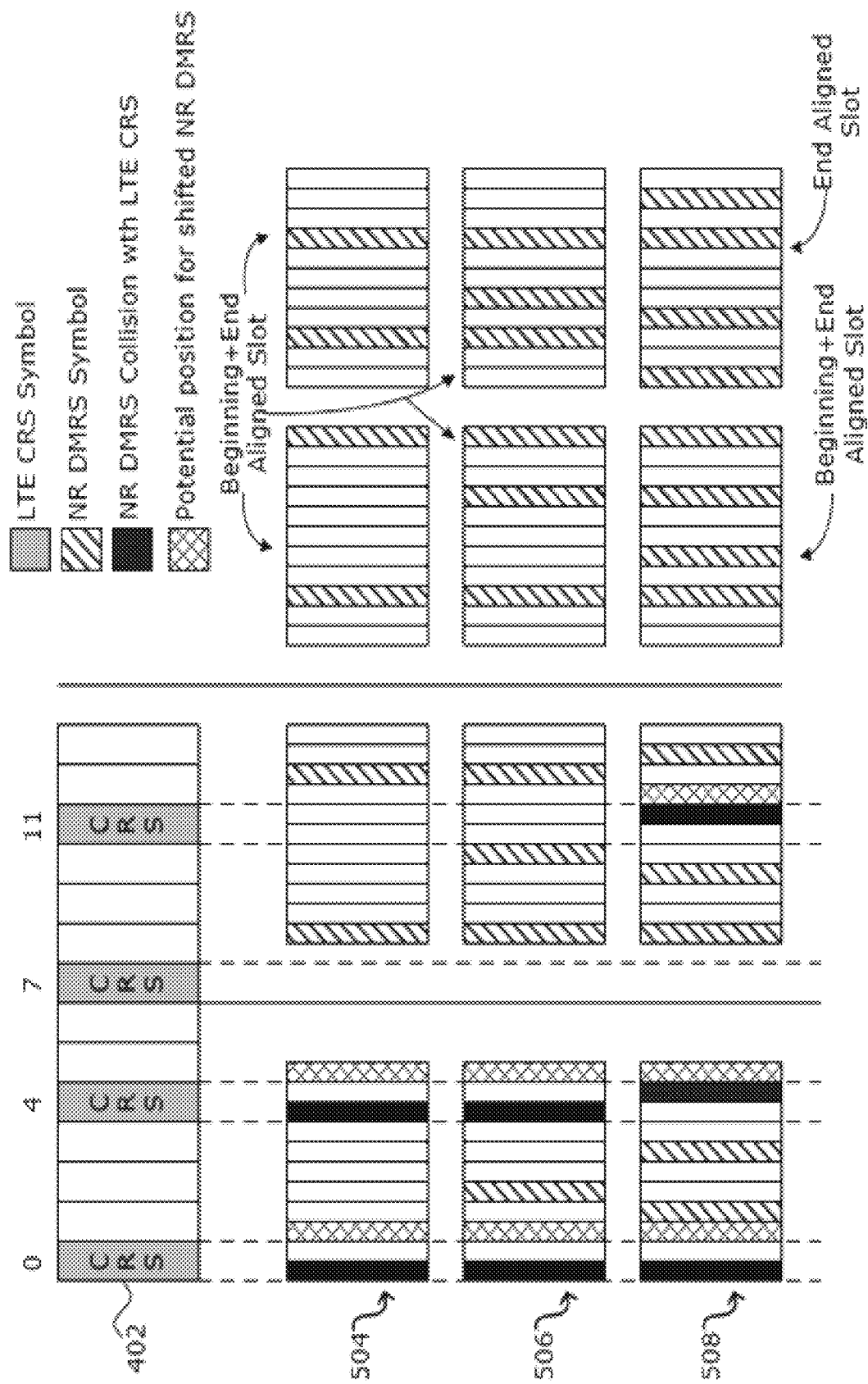
Figure 5B:
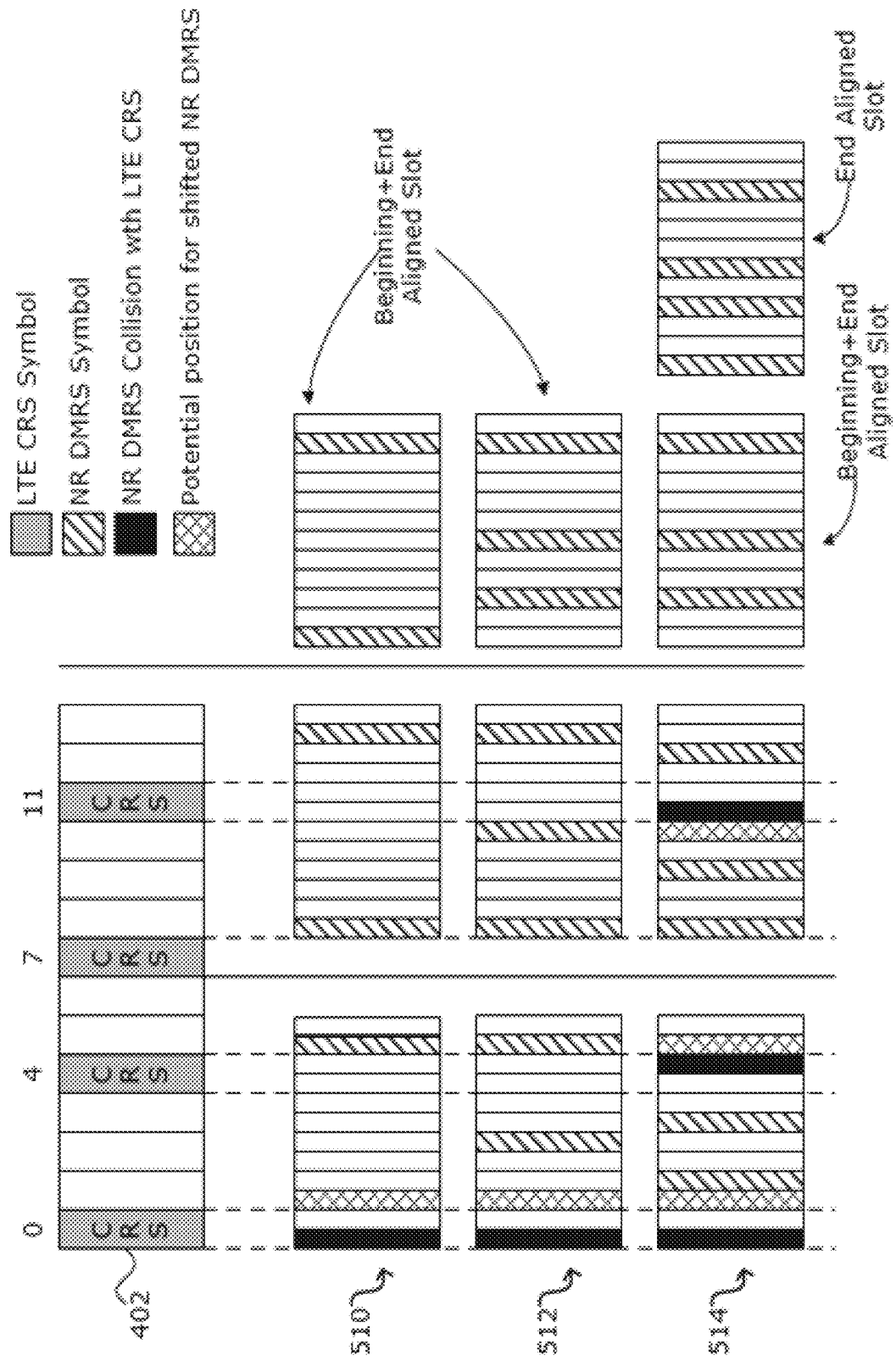

FIGS. 5A and 5B illustrates examples of PDSCH Mapping Type B with lengths of 11-12 symbols, according to various embodiments. In the example of FIGS. 5A and 5B, the LTE CRS pattern 402 includes an SCS of 15 kHz, and the NR Type B DMRS has an SCS of 30 kHz.

FIG. 5A shows an example PDSCH Mapping Type B scheme for a PDSCH duration ($l_d$) of 11, which is aligned with an LTE CRS pattern 402. NR-DMRS Type B mapping 504 shows an 11 symbol PDSCH ($l_d$=11) where NR-DMRSs are transmitted in the position of the first NR-DMRS symbol ($l_0$) and the ninth symbol (e.g., symbol 8) (e.g., DMRS: $\{l_0, 8\}$). NR-DMRS Type B mapping 506 shows an 11 symbol PDSCH ($l_d$=11) where NR-DMRSs are transmitted in the position of the first NR-DMRS symbol ($l_0$), the fifth symbol (e.g., symbol 4), and the ninth symbol (e.g., symbol 8) (e.g., DMRS: $\{l_0, 4, 8\}$). NR-DMRS Type B mapping 508 shows an 11 symbol PDSCH ($l_d$=11) where NR-DMRSs are transmitted in the position of the first NR-DMRS symbol ($l_0$), the fourth symbol (e.g., symbol 3), the seventh symbol (e.g., symbol 6), and the tenth symbol (e.g., symbol 9) (e.g., DMRS: $\{l_0, 3, 6, 9\}$).

In mappings 504, 506, and 508, a first inter-RAT RS collision takes place due to an NR-DMRS transmitted at NR-DMRS symbol $l_0$ in a first slot colliding with the LTE CRS transmitted in symbol 0 of the LTE subframe 402. In mappings 504 and 506, a second inter-RAT RS collision takes place due to an NR-DMRS transmitted at NR-DMRS symbol 8 in the first slot colliding with the LTE CRS transmitted in symbol 4 of the LTE subframe 402. In mapping 508, a second inter-RAT RS collision takes place due to an NR-DMRS transmitted at NR-DMRS symbol 9 in the first slot colliding with the LTE CRS transmitted in symbol 4 of the LTE subframe 402. Additionally, mapping 508 includes a third inter-RAT RS collision, which takes place due to an NR-DMRS transmitted at NR-DMRS symbol 6 in the second slot colliding with the LTE CRS transmitted in symbol 11 of the LTE subframe 402.

In one embodiment for 11 symbol PDSCH ($l_d$=11), the DMRS position is shifted to symbol 2 and possibly three additional DMRSs can be configured. If one additional DMRS is configured, the DMRS position is symbol 7. If two additional DMRSs is configured, the DMRS positions are symbol 7 and symbol 10. If three additional DMRSs are configured, the DMRS positions are symbol 4, symbol 7, and symbol 10.

In one embodiment for 11 symbol PDSCH ($l_d$=11), the DMRS position is shifted to symbol 2 and possibly three additional DMRSs can be configured. If one additional DMRS is configured, the DMRS position is symbol 7. If two additional DMRSs are configured, the DMRS positions are symbol 4 and symbol 7. If three additional DMRSs are configured, the DMRS positions are symbol 4, symbol 7, and symbol 10

In one embodiment for 11 symbol PDSCH ($l_d$=11), the DMRS position is shifted to symbol 2 and possibly three additional DMRSs can be configured. If one additional DMRS is configured, the DMRS is located in symbol 10. If two additional DMRSs are configured, the DMRS positions are symbol 7 and symbol 10. If three additional DMRSs are configured, the DMRS positions are symbol 4, symbol 7, and symbol 10.

In one embodiment for 11 symbol PDSCH ($l_d$=11), the DMRS position is shifted to symbol 2 and possibly three additional DMRSs can be configured. If one additional DMRS is configured, the DMRS is located in symbol 10. If two additional DMRSs are configured, the DMRS positions are symbol 4 and symbol 7. If three additional DMRSs are configured, the DMRS positions are symbol 4, symbol 7, and symbol 10.

In one 11 symbol PDSCH ($l_d$=11) embodiment where the PDSCH mapping type B slot boundary is aligned with the end of the LTE subframe 402, the DMRS position is symbol 0 and possibly three additional DMRS can be configured. If one additional DMRS is configured, the DMRS position is symbol 8. If two additional DMRSs are configured, the DMRS positions are symbol 4 and symbol 8. If three additional DMRSs are configured, the DMRS positions are symbol 3, symbol 7, and symbol 9.

In another 11 symbol PDSCH ($l_d$=11) embodiment where the PDSCH mapping type B slot boundary is aligned with the end of the LTE subframe 402, the DMRS position is symbol 0 and possibly three additional DMRS can be configured. If one additional DMRS is configured, the DMRS position is symbol 7. If two additional DMRSs are configured, the DMRS positions are symbol 3 and symbol 7. If three additional DMRSs are configured, the DMRS positions are symbol 3, symbol 7, and symbol 9.

FIG. 5B shows an example PDSCH Mapping Type B scheme for a PDSCH duration ($l_d$) of 12, which is aligned with an LTE CRS pattern 402. NR-DMRS Type B mapping 510 shows a 12 symbol PDSCH ($l_d$=12) where NR-DMRSs are transmitted in the position of the first NR-DMRS symbol ($l_0$) and the eleventh symbol (e.g., symbol 10) (e.g., DMRS: $\{l_0, 10\}$). NR-DMRS Type B mapping 512 shows a 12 symbol PDSCH ($l_d$=12) where NR-DMRSs are transmitted in the position of the first NR-DMRS symbol ($l_a$), the sixth symbol (e.g., symbol 5), and the eleventh symbol (e.g., symbol 10) (e.g., DMRS: $\{l_0, 5, 10\}$). NR-DMRS Type B mapping 514 shows a 12 symbol PDSCH ($l_d$=12) where NR-DMRSs are transmitted in the position of the first NR-DMRS symbol ($l_a$), the fourth symbol (e.g., symbol 3), the seventh symbol (e.g., symbol 6), and the tenth symbol (e.g., symbol 9) (e.g., DMRS: $\{l_0, 3, 6, 9\}$).

In mappings 510, 512, and 514, a first inter-RAT RS collision takes place due to an NR-DMRS transmitted at NR-DMRS symbol $l_0$ in a first slot colliding with the LTE CRS transmitted in symbol 0 of the LTE subframe 402. In mapping 514, a second inter-RAT RS collision takes place due to an NR-DMRS transmitted at NR-DMRS symbol 9 in the first slot colliding with the LTE CRS transmitted in symbol 4 of the LTE subframe 402. Additionally, mapping 514 includes a third inter-RAT RS collision taking place due to an NR-DMRS transmitted at NR-DMRS symbol 6 in the second slot colliding with the LTE CRS transmitted in symbol 11 of the LTE subframe 402.

In one embodiment for 12 symbol PDSCH ($l_d$=12), the DMRS position is shifted to symbol 2 and possibly three additional DMRSs are configured. If one additional DMRS is configured, the DMRS position is symbol 10. If two additional DMRSs are configured, the DMRS positions are symbol 5 and symbol 10. If three additional DMRSs are configured, then only two additional DMRSs are transmitted and the DMRS positions are symbol 5 and symbol 10.

In one 12 symbol PDSCH ($l_d$=12) embodiment where the PDSCH mapping type B slot boundary is aligned with the end of the LTE subframe 402, DMRS position is symbol 0 and possibly three additional DMRSs are configured. If one additional DMRS is configured, the DMRS position is symbol 10. If two additional DMRSs are configured, the DMRS positions are symbol 5 and symbol 10. If three additional DMRSs are configured, the DMRS positions are symbol 3, symbol 5, and symbol 9.

In another 12 symbol PDSCH ($l_d$=12) embodiment where the PDSCH mapping type B slot boundary is aligned with the end of the LTE subframe 402, the DMRS position is symbol 0 and possibly three additional DMRS can be configured. If one additional DMRS is configured, the DMRS position is symbol 10. If two additional DMRSs are configured, the DMRS positions are symbol 4 and symbol 10. If three additional DMRSs are configured, the DMRS positions are symbol 4, symbol 8, and symbol 10.

In another 12 symbol PDSCH ($l_d$=12) embodiment where the PDSCH mapping type B slot boundary is aligned with the end of the LTE subframe 402, the DMRS position is symbol 0 and possibly three additional DMRS can be configured. If one additional DMRS is configured, the DMRS position is symbol 10. If two additional DMRSs are configured, the DMRS positions are symbol 4 and symbol 10. If three additional DMRSs are configured, the DMRS positions are symbol 4, symbol 7, and symbol 10.

Figure 6A:
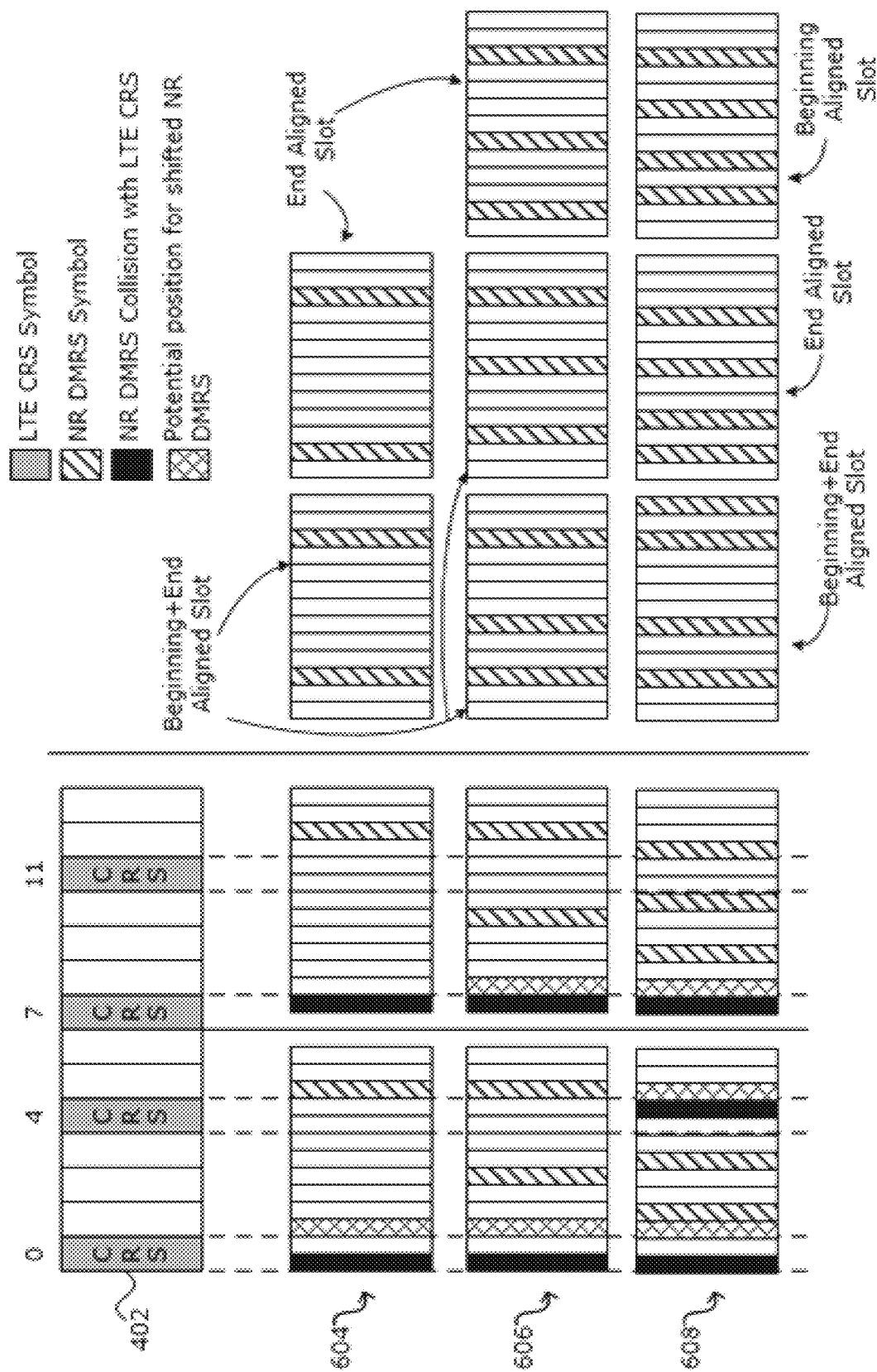
Figure 6B:
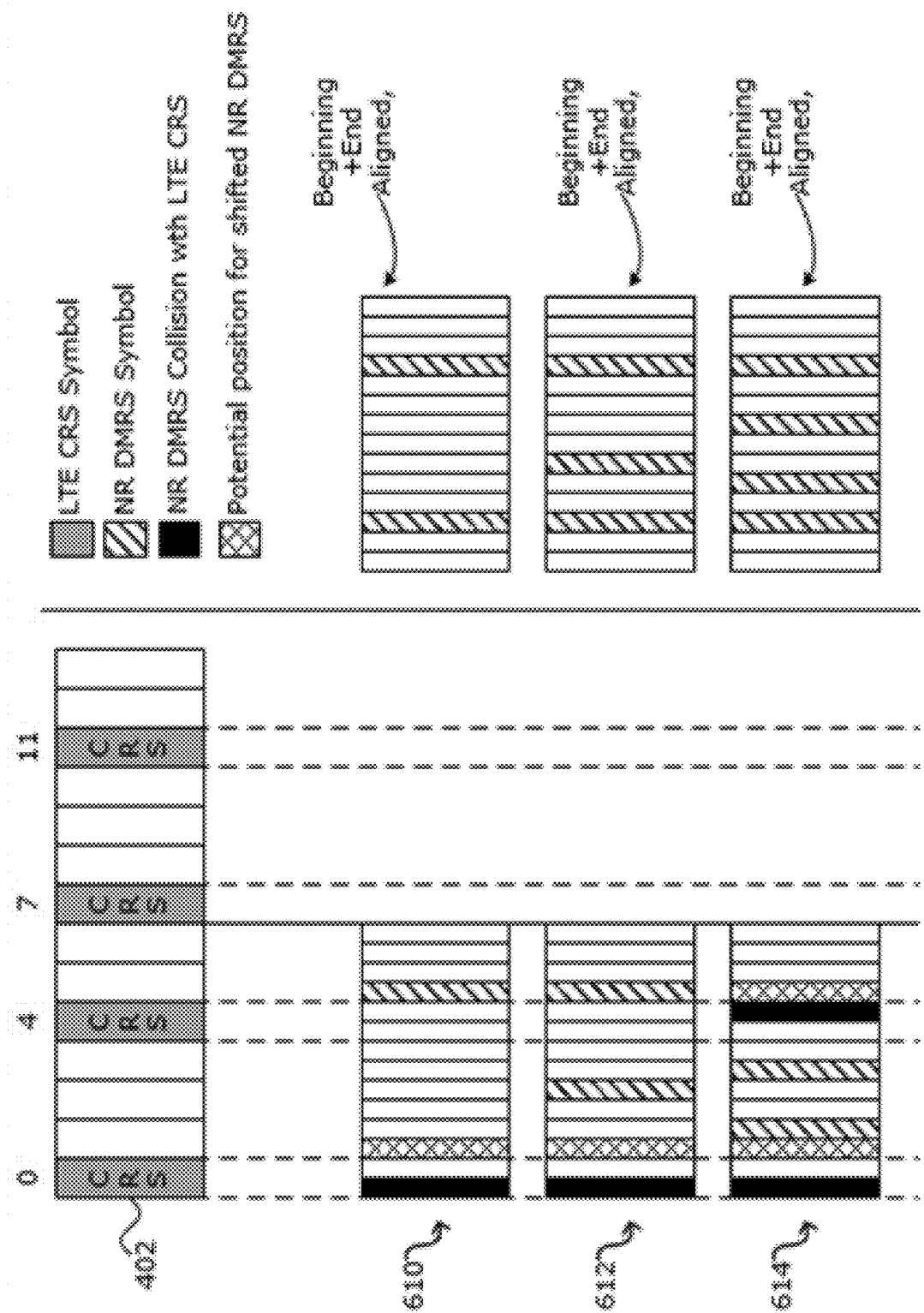

FIGS. 6A and 6B illustrates examples of PDSCH Mapping Type B with lengths of 13-14 symbols, according to various embodiments In the example of FIGS. 5A and 5B, the LTE CRS pattern 402 includes an SCS of 15 kHz, and the NR Type B DMRS has an SCS of 30 kHz.

FIG. 6A shows an example PDSCH Mapping Type B scheme for a PDSCH duration ($l_d$) of 13, which is aligned with an LTE CRS pattern 402. NR-DMRS Type B mapping 604 shows a 13 symbol PDSCH ($l_d$=13) where NR-DMRSs are transmitted in the position of the first NR-DMRS symbol ($l_0$) and the eleventh symbol (e.g., symbol 10) (e.g., DMRS: $\{l_0, 10\}$). NR-DMRS Type B mapping 606 shows a 13 symbol PDSCH ($l_d$=13) where NR-DMRSs are transmitted in the position of the first NR-DMRS symbol ($l_0$), the sixth symbol (e.g., symbol 5), and the eleventh symbol (e.g., symbol 10) (e.g., DMRS: $\{l_0, 5, 10\}$). NR-DMRS Type B mapping 608 shows a 13 symbol PDSCH ($l_d$=13) where NR-DMRSs are transmitted in the position of the first NR-DMRS symbol ($l_0$), the fourth symbol (e.g., symbol 3), the seventh symbol (e.g., symbol 6), and the tenth symbol (e.g., symbol 9) (e.g., DMRS: $\{l_0, 3, 6, 9\}$).

In mappings 604, 606, and 608, a first inter-RAT RS collision takes place due to an NR-DMRS transmitted at NR-DMRS symbol $l_0$ in a first slot colliding with the LTE CRS transmitted in symbol 0 of the LTE subframe 402, and a second inter-RAT RS collision takes place due to an NR-DMRS transmitted at NR-DMRS symbol $l_0$ in a second slot colliding with the LTE CRS transmitted in symbol 7 of the LTE subframe 402. In mapping 608, a third inter-RAT RS collision takes place due to an NR-DMRS transmitted at NR-DMRS symbol 9 in the first slot colliding with the LTE CRS transmitted in symbol 4 of the LTE subframe 402.

In one embodiment for 13 symbol PDSCH ($l_d$=13), the DMRS position is shifted to symbol 2 and possibly three additional DMRS can be configured. If one additional DMRS is configured, the DMRS position is symbol 10. If two additional DMRSs are configured, the DMRS positions are symbol 5 and symbol 10. If three additional DMRSs are configured, the DMRS positions are symbol 5, symbol 10, and symbol 12.

In one embodiment for 13 symbol PDSCH ($l_d$=13), the DMRS position is shifted to symbol 2 and possibly three additional DMRS can be configured. If one additional DMRS is configured, the DMRS position is symbol 10. If two additional DMRSs are configured, the DMRS positions are symbol 6 and symbol 10. If three additional DMRSs are configured, the DMRS positions are symbol 5, symbol 10, and symbol 12.

In one 13 symbol PDSCH ($l_d$=13) embodiment where the PDSCH mapping type B slot boundary is aligned with the end of the LTE subframe 402, the DMRS position is symbol 1 and possibly three additional DMRS can be configured. If one additional DMRS is configured, the DMRS position is symbol 10. Alternatively, if one additional DMRS is configured, the DMRS position is symbol 9. If two additional DMRSs are configured, the DMRS positions are symbol 5 and symbol 10. Alternatively, if two additional DMRSs are configured, the DMRS positions are symbol 6 and symbol 10. Alternatively, if two additional DMRSs are configured, the DMRS positions are symbol 5 and symbol 9. If three additional DMRSs are configured, the DMRS positions are symbol 3, symbol 6, and symbol 9. Alternatively, if three additional DMRSs are configured, the DMRS positions are symbol 5, symbol 9, and symbol 11.

In one 13 symbol PDSCH ($l_d$=13) embodiment where the PDSCH mapping type B slot boundary is aligned with the beginning of the LTE subframe 402, the DMRS position is symbol 2 and possibly three additional DMRS can be configured. If one additional DMRS is configured, the DMRS position is symbol 10. If two additional DMRSs are configured, the DMRS positions are symbol 5 and symbol 10. Alternatively, if two additional DMRSs are configured, the DMRS positions are symbol 6 and symbol 10. If three additional DMRSs are configured, the DMRS positions are symbol 4, symbol 7, and symbol 10.

FIG. 6B shows an example PDSCH Mapping Type B scheme for a PDSCH duration ($l_d$) of 14, which is aligned with an LTE CRS pattern 402. NR-DMRS Type B mapping 610 shows a 14 symbol PDSCH ($l_d$=14) where NR-DMRSs are transmitted in the position of the first NR-DMRS symbol ($l_0$) and the eleventh symbol (e.g., symbol 10) (e.g., DMRS: $\{l_0, 10\}$). NR-DMRS Type B mapping 612 shows a 14 symbol PDSCH ($l_d$=14) where NR-DMRSs are transmitted in the position of the first NR-DMRS symbol ($l_0$), the sixth symbol (e.g., symbol 5), and the eleventh symbol (e.g., symbol 10) (e.g., DMRS: $\{l_0, 5, 10\}$). NR-DMRS Type B mapping 614 shows a 14 symbol PDSCH ($l_d$=14) where NR-DMRSs are transmitted in the position of the first NR-DMRS symbol ($l_0$), the fourth symbol (e.g., symbol 3), the seventh symbol (e.g., symbol 6), and the tenth symbol (e.g., symbol 9) (e.g., DMRS: $\{l_0, 3, 6, 9\}$).

In mappings 610, 612, and 614, a first inter-RAT RS collision takes place due to an NR-DMRS transmitted at NR-DMRS symbol $l_0$ in a first slot colliding with the LTE CRS transmitted in symbol 0 of the LTE subframe 402. In mapping 614, a second inter-RAT RS collision takes place due to an NR-DMRS transmitted at NR-DMRS symbol 9 in the first slot colliding with the LTE CRS transmitted in symbol 4 of the LTE subframe 402.

In one embodiment for 14 symbol PDSCH ($l_d$=14), the DMRS position is shifted to symbol 2 and possibly three additional DMRS can be configured. If one additional DMRS is configured, the DMRS position is symbol 10. If two additional DMRSs are configured, the DMRS positions are symbol 5 and symbol 10. Alternately, if two additional DMRSs are configured, the DMRS positions are symbol 6 and symbol 10. If three additional DMRSs are configured, the DMRS positions are symbol 4, symbol 7, and symbol 10. Alternately, if three additional DMRSs are configured, the DMRS positions are symbol 5, symbol 10, and symbol 12.

In any of the embodiments discussed herein, when the 5G/NR-capable UE 102 is operating in a licensed or an unlicensed band, and is configured with higher-layer parameter lte-CRS-ToMatchAround within ServingCellConfig (see e.g., Table 1a and Table 1b supra) where one or multiple LTE CRS patterns in one or more CCs which overlap fully or partially with the NR CC(s) are indicated using RRC configuration IE RateMatchPatternLTE-CRS, in the case of multiple configured LTE CRS patterns, the configuration includes frequency domain allocations corresponding to different LTE CCs which fully or partially overlap with the NR-U CCs. Based on this configuration the UE 102 is able to apply the corresponding rate matching pattern for PDSCH in a given frequency and time domain allocation.

Additionally or alternatively, when a 5G/NR RAT is operating in the same or partially overlapped LTE CC in licensed bands and the 5G/NR-capable UE 102 receives a DL transmission from multiple TRxPs (or a multi-RF panel device), and each TRxP (or each panel of the multi-RF panel device) also transmits on the LTE RAT, the 5G/NR-capable UE 102 can be configured with multiple LTE CRS rate matching patterns by extending the lte-CRS-ToMatchAround higher layer parameter to support multiple RateMatchPatternLTE-CRS IEs each corresponding to an LTE CC.

Additionally or alternatively, the multiple RateMatchPatternLTE-CRS IEs can be associated with a TRxP (or individual panel of the multi-RF panel device) and this association can be explicitly configured. For example, a higher layer configuration for the rate matching pattern may include an explicit TRxP ID that is associated with a CORESET, which contains a DCI scheduling the PDSCH for the TRxP.

Additionally or alternatively, the different rate matching patterns can each be associated with a DMRS CDM group where DMRS ports within the CDM group are used for receiving PDSCH(s) from the different TRxPs to which the rate matching pattern is associated. For example, the RateMatchPatternLTE-CRS configuration can include an association with a DMRS CDM group based on the configured DMRS.

1.3. Rate-Matching for Lte CRS/MBSFN for Dynamic Point Selection and Non-Coherent Joint Transmission In some embodiments, the parameter/field RateMatchPatternLTE-CRS is part of the RateMatchPattern IE of the ServingCellConfig (see e.g., Table 1a and Table 1b supra). In these embodiments, two LTE CRS-MBSFN patterns can be configured using the parameters/fields rateMatchPatternGroup1 and rateMatchPatternGroup2. According to Rel-15, rateMatchPatternGroup1 and rateMatchPatternGroup2 can be configured (e.g., via RRC signaling) and a DCI can be used to dynamically indicate whether the UE 102 should use rateMatchPatternGroup1, rateMatchPatternGroup2, or both for the purposes of PDSCH rate matching.

For example, an AN 108 can set the "Rate matching indicator" field in DCI format 1_1 field, and send the DCI format 1_1 message to the UE 102 to dynamically select one of the two configured CRS-MBSFN patterns for a PDSCH transmission using dynamic point selection (DPS). In these embodiments, the UE 102 applies the indicated CRS-MBSFN pattern to the scheduled PDSCH. Additionally, the AN 108 can dynamically indicate two CRS-MBSFN patterns for non-coherent joint transmission (NC-JT)PDSCH transmission. In embodiments, this behavior is maintained for both non-overlapping and full/partially overlapping PDSCHs. In other words, PDSCH scheduled from different TRxPs may have different rate-matching behavior with respect to RateMatchPattern.

In embodiments, when two CRS-MBSFN patterns are indicated corresponding to a PDSCH associated with two TCI states, the UE 102 applies the CRS-MBSFN pattern corresponding to rateMatchPatternGroup1 to the multiple input multiple output (MIMO) layers corresponding to the antenna ports associated with the first TCI state and the CRS-MBSFN pattern corresponding to rateMatchPatternGroup2 to the MIMO layers corresponding to the antenna ports associated with the second TCI state. In embodiments, when two CRS-MBSFN patterns are indicated corresponding to a PDSCH transmission, the UE 102 applies the union of CRS-MBSFN patterns corresponding to rateMatchPatternGroup1 and rateMatchPatternGroup2 to all the MIMO layers corresponding to the scheduled PDSCH.

The parameter rateMatchPatternGroup1 indicates the IDs of a first group of RateMatchPatterns and the parameter rateMatchPatternGroup2 indicates the IDs of a second group of RateMatchPatterns, both of which are defined in the rateMatchPatternToAddModList of the PDSCH-Config (BWP level) or in the rateMatchPatternToAddModList of the ServingCellConfig (cell level). Both of these patterns can be activated dynamically by DCI, for example, using DCI format 1_1. The field/parameter rateMatchPatternToAddModList indicates the resources patterns which the UE 102 should rate match PDSCH around. The UE 102 rate matches around the union of all resources indicated in the rate match patterns (see e.g., [TS38214], clause 5.1.4.1).

The UE 102 may be configured with any of the following higher layer parameters indicating REs declared as not available for PDSCH: rateMatchPatternToAddModList given by a PDSCH configuration (PDSCH-Config) IE, by ServingCellConfig (see e.g., Table 1a and Table 1b supra), or by ServingCellConfigCommon and configuring up to 4 RateMatchPattern(s) per BWP and up to 4 RateMatchPattern(s) per serving-cell.

A RateMatchPattern may contain, within a BWP, when provided by PDSCH-Config or within a serving cell when provided by ServingCellConfig or ServingCellConfigCommon, a pair of reserved resources with numerology provided by higher layer parameter subcarrierSpacing given by RateMatchPattern when configured per serving cell or by numerology of associated BWP when configured per BWP. The pair of reserved resources are respectively indicated by an RB level bitmap (higher layer parameter resourceBlocks given by RateMatchPattern) with 1 RB granularity and a symbol level bitmap spanning one or two slots (higher layer parameters symbolsInResourceBlock given by RateMatchPattern) for which the reserved RBs apply. A bit value equal to 1 in the RB and symbol level bitmaps indicates that the corresponding resource is not available for PDSCH. For each pair of RB and symbol level bitmaps, the UE 102 may be configured with a time-domain pattern (higher layer parameter periodicityAndPattern given by RateMatchPattern), where each bit of periodicityAndPattern corresponds to a unit equal to a duration of the symbol level bitmap, and a bit value equal to 1 indicates that the pair is present in the unit. The periodicityAndPattern can be {1, 2, 4, 5, 8, 10, 20 or 40} units long, but maximum of 40 ms. The first symbol of periodicityAndPattern every 40 ms/P periods is a first symbol in frame $n_f$ mod 4=0, where P is the duration of periodicityAndPattern in units of ms. When periodicityAndPattern is not configured for a pair, for a symbol level bitmap spanning two slots, the bits of the first and second slots correspond respectively to even and odd slots of a radio frame, and for a symbol level bitmap spanning one slot, the bits of the slot correspond to every slot of a radio frame. The pair can be included in one or two groups of resource sets (e.g., higher layer parameters rateMatchPatternGroup1 and rateMatchPatternGroup2). The rateMatchPatternToAdd-ModList given by ServingCellConfig or ServingCellConfigCommon configuration in numerology p applies only to PDSCH of the same numerology p.

Additionally or alternatively, a RateMatchPattern may contain, within a BWP, a frequency domain resource of a CORESET configured by ControlResourceSet with controlResourceSetId or ControlResourceSetZero and time domain resource determined by the higher layer parameters monitoringSlotPeriodicityAndOffset, duration and monitoringSymbolsWithinSlot of all search-space-sets configured by SearchSpace and time domain resource of search-space-set zero configured by searchSpaceZero associated with the CORESET as well as CORESET duration configured by ControlResourceSet with controlResourceSetId or ControlResourceSetZero. This resource not available for PDSCH can be included in one or two groups of resource sets (higher layer parameters rateMatchPatternGroup1 and rateMatchPatternGroup2).

A configured group rateMatchPatternGroup1 or rateMatchPatternGroup2 contains a list of indices of RateMatchPattern(s) forming a union of resource-sets not available for a PDSCH dynamically if a corresponding bit of the Rate matching indicator field of the DCI format 1_1 scheduling the PDSCH is equal to 1. The REs corresponding to the union of resource-sets configured by RateMatchPattern(s) that are not included in either of the two groups are not available for a PDSCH scheduled by a DCI format 1_0, a PDSCH scheduled by a DCI format 1_1, and PDSCHs with SPS. When receiving a PDSCH scheduled by a DCI format 1_0 or PDSCHs with SPS activated by a DCI format 1_0, the REs corresponding to configured resources in rateMatchPatternGroup1 or rateMatchPatternGroup2 are not available for the scheduled PDSCH.

For a bitmap pair included in one or two groups of resource sets, the dynamic indication of availability for PDSCH applies to a set of slot(s) where the rateMatchPatternToAddModList is present among the slots of scheduled PDSCH. If the UE 102 monitors PDCCH candidates of aggregation levels 8 and 16 with the same starting CCE index in non-interleaved CORESET spanning one OFDM symbol and if a detected PDCCH scheduling the PDSCH has aggregation level 8, the resources corresponding to the aggregation level 16 PDCCH candidate are not available for the PDSCH.

If a PDSCH scheduled by a PDCCH would overlap with resources in the CORESET containing the PDCCH, the resources corresponding to a union of the detected PDCCH that scheduled the PDSCH and associated PDCCH DM-RS are not available for the PDSCH. When precoderGranularity configured in a CORESET where the PDCCH was detected is equal to allContiguousRBs, the associated PDCCH DM-RS are DM-RS in all REGs of the CORESET. Otherwise, the associated DM-RS are the DM-RS in REGs of the PDCCH or the activated PDSCHs with SPS. When receiving PDSCHs with SPS activated by a DCI format 1_1, the REs corresponding to configured resources in rateMatchPatternGroup1 or rateMatchPatternGroup2 are not available for the PDSCHs with SPS if a corresponding bit of the Rate matching indicator field of the DCI format 1_1 activating the PDSCHs with SPS is equal to 1.

1.4. Rate-Matching for Semi-Persistent and Periodic Zero-Power CSI-RS for Dynamic Point Selection and Non-Coherent Joint Transmission One purpose of semi-persistent/periodic (SP/P) zero power (ZP) CSI-RS is to allow measurement of interference from other cells by the UE 102. In order to maintain this functionality, SP/P ZP CSI-RS may be treated as a TRxP or cell specific resource. In other words, in various embodiments, for multi-DCI NC-JT, rate-matching of PDSCH scheduled by a first TRxP (TRP-0) or a second TRxP (TRP-1) should be performed around SP/PZP CSI-RS associated with TRP-0 or TRP-1, respectively. The same principle may apply to the case of single-DCI based NC-JT. This issue can be resolved to a certain extent by RateMatchPattern (e.g., UE behavior can be similar to that of RateMatchPattern). However RateMatchPattern is not RE specific in the frequency domain, and therefore, it may be inefficient in handling ZP CSI-RS. Therefore, the same solution for rate-matching around LTE CRS can be used for this case as well by configuring SP/P ZP CSI-RS pattern as part of RateMatchPattern IE.

For example, the UE 102 may be configured with REs indicated by the RateMatchingPatternLTE-CRS in lte-CRS-ToMatchAround in ServingCellConfig or ServingCellConfigCommon configuring common RS, in 15 kHz SCS applicable only to 15 kHz subcarrier spacing PDSCH, of one LTE carrier in a serving cell are declared as not available for PDSCH. Additionally or alternatively the UE 102 may be configured with REs indicated by RateMatchingPatternLTE-CRS in lte-CRS-PatternList-r16 in ServingCellConfig configuring common RS, in 15 kHz SCS applicable only to 15 kHz SCS PDSCH, of one LTE carrier in a serving cell are declared as not available for PDSCH.

Each RateMatchingPatternLTE-CRS configuration contains v-Shift including LTE-CRS-vshift(s), nrofCRS-Ports consisting of LTE-CRS antenna ports 1, 2 or 4 ports, carrierFreqDL representing the offset in units of 15 kHz subcarriers from (reference) point A to the LTE carrier center subcarrier location, carrierBandwidthDL representing the LTE carrier bandwidth, and may also configure mbsfn-SubframeConfigList representing MBSFN subframe configuration. The UE 102 determines the CRS position within the slot according to Clause 6.10.1.2 in [TS36211], where a slot corresponds to an LTE subframe.

If the UE 102 is configured by higher layer parameter PDCCH-Config with two different values of CORESET-PoolIndex in ControlResourceSet and is also configured by the higher layer parameter LTE-CRS-PatternList-r16 and lte-CRS-PatternListSecond-r16 in ServingCellConfig, the following REs are declared as not available for PDSCH: if the UE 102 is configured with [crs-RateMatch-PerCORESETPoolIndex], REs indicated by the CRS pattern(s) in lte-CRS-PatternListSecond-r16 if the PDSCH is associated with CORESETPoolIndex=0, or the CRS pattern(s) in lte-CRS-PatternListSecond-r16 if PDSCH is associated with CORESETPoolIndex=1; otherwise, REs indicated by CRS-PatternList-r16 and lte-CRS-PatternListSecond-r16, in ServingCellConfig.

Within a BWP, the UE 102 can be configured with one or more ZP CSI-RS resource set configuration(s) for aperiodic, semi-persistent and periodic time-domain behaviors (e.g., higher layer parameters aperiodic-ZP-CSI-RS-ResourceSetsToAddModList, sp-ZP-CSI-RS-ResourceSetsToAddModList and p-ZP-CSI-RS-ResourceSet respectively included in a PDSCH-Config), with each ZP-CSI-RS resource set including at most 16 ZP CSI-RS resources (e.g., higher layer parameter ZP-CSI-RS-Resource) in numerology of the BWP. The REs indicated by p-ZP-CSI-RS-ResourceSet are declared as not available for PDSCH. The REs indicated by sp-ZP-CSI-RS-ResourceSetsToAddModList and aperiodic-ZP-CSI-RS-ResourceSetsToAddModList are declared as not available for PDSCH when their triggering and activation are applied, respectively.

The following parameters are configured via higher layer signaling for each ZP CSI-RS resource configuration: zp-CSI-RS-ResourceId in ZP-CSI-RS-Resource determines ZP CSI-RS resource configuration identity; nrofPorts defines the number of CSI-RS ports, where the allowable values are given in Clause 7.4.1.5 of [TS38211]; cdm-Type defines CDM values and pattern, where the allowable values are given in Clause 7.4.1.5 of [TS38211]; resourceMapping given by ZP-CSI-RS-Resource defines the OFDM symbol and subcarrier occupancy of the ZP-CSI-RS resource within a slot that are given in Clause 7.4.1.5 of [TS38211]; and/or periodicityAndOffset in ZP-CSI-RS-Resource defines the ZP-CSI-RS periodicity and slot offset for periodic/semi-persistent ZP-CSI-RS.

The UE 102 may be configured with a DCI field for triggering the aperiodic ZP-CSI-RS. A list of ZP-CSI-RS-ResourceSet(s), provided by higher layer parameter aperiodic-ZP-CSI-RS-ResourceSetsToAddModList in PDSCH-Config, is configured for aperiodic triggering. The maximum number of aperiodic ZP-CSI-RS-ResourceSet(s) configured per BWP is 3. The bit-length of DCI field ZP CSI-RS trigger depends on the number of aperiodic ZP-CSI-RS-ResourceSet(s) configured (up to 2 bits). Each non-zero codepoint of ZP CSI-RS trigger in DCI format 1_1 triggers one aperiodic ZP-CSI-RS-ResourceSet in the list aperiodic-ZP-CSI-RS-ResourceSetsToAddModList by indicating the aperiodic ZP CSI-RS resource set ID. The DCI codepoint '01' triggers the resource set with ZP-CSI-RS-ResourceSetIds=1, the DCI codepoint '10' triggers the resource set with ZP-CSI-RS-ResourceSetIds=2, and the DCI codepoint '11' triggers the resource set with ZP-CSI-RS-ResourceSetIds=3. Codepoint '00' is reserved for not triggering aperiodic ZP CSI-RS. When receiving PDSCH scheduled by DCI format 1_0 or PDSCHs with SPS activated by DCI format 1_0, the REs corresponding to configured resources in aperiodic-ZP-CSI-RS-ResourceSetsToAddModList are available for PDSCH.

2. Example Implementations

Figure 7:
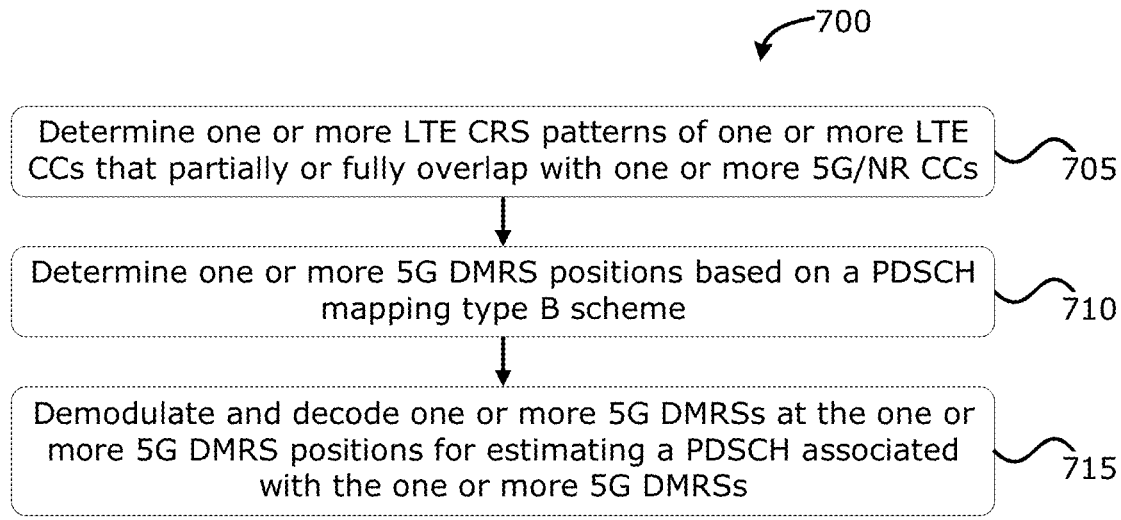
FIGS. 7-8 show an example processes for practicing various embodiments herein.
Figure 8:
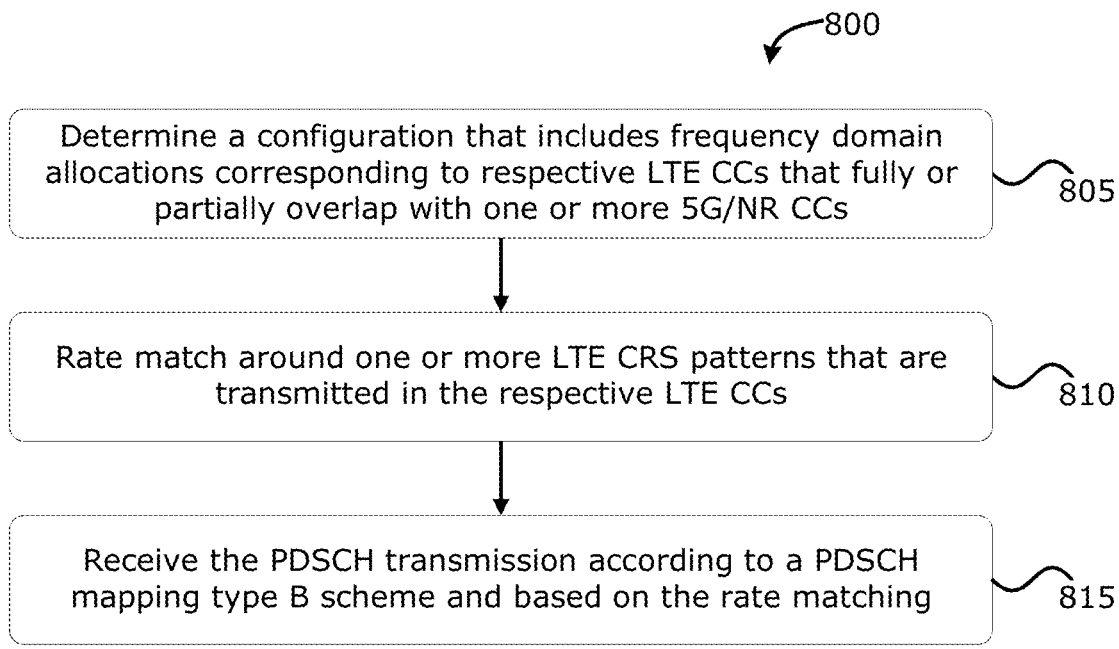

FIGS. 7 and 8 processes 700 and 800, respectively, in accordance with various embodiments. For illustrative purposes, the various operations of process 700 and process 800 are described as being performed by the UE 102 or elements thereof. Additionally, the various messages/signaling communicated by the UE 102 with, for example, RAN node 108 may be sent/received over the various interfaces discussed herein with respect to FIGS. 1-11, and using the various mechanisms discussed herein including those discussed herein with respect to FIGS. 1-11. While particular examples and orders of operations are illustrated FIGS. 7 and 8, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring now to FIG. 7, process 700 begins at operation 705 where the UE 102 determines one or more LTE CRS patterns of one or more LTE CCs that fully or partially overlaps with one or more 5G/NR CCs. At operation 710, the UE 102 determines one or more 5G DMRS positions to avoid reference signal collision between 5G DMRS symbols an LTE CRS symbols. At operation 715, the UE 102 demodulates and decodes one or more 5G DMRSs at the one or more 5G DMRS positions for estimating a PDSCH associated with the one or more 5G DMRSs.

Referring now to FIG. 8, process 800 begins at operation 805 where the UE 102 determines a configuration that includes frequency domain allocations corresponding to respective LTE CCs that fully or partially overlap with one or more 5G/NR CCs. At operation 810, the UE 102 performs rate matching around one or more LTE CRS patterns that are transmitted in the respective LTE CCs that are fully or partially overlapping with the one or more 5G/NR CCs in which a PDSCH transmission is to be received. At operation 810, the UE 102 receives the PDSCH transmission according to a PDSCH mapping type B scheme and based on the rate matching.

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a method comprising: determining a Long Term Evolution (LTE) Cell-specific Reference Signal (CRS) pattern of a LTE Component Carrier (CC) that fully or partially overlaps with a Fifth Generation (5G) CC; determining one or more 5G Demodulation Reference Signal (DMRS) positions to avoid reference signal collision between 5G DMRS symbols an LTE CRS symbols; and demodulating and decoding one or more 5G DMRSs at the one or more 5G DMRS positions for estimating a Physical Downlink Shared Channel (PDSCH) associated with the one or more 5G DMRSs.

Example A02 includes the method of example A01 and/or some other example(s) herein, wherein the 5G CC operates with a 30 kilohertz (kHz) subcarrier spacing (SCS) or a 15 kHz SCS, and the LTE CC operates with a 15 kHz SCS.

Example A03 includes the method of examples A01-A02 and/or some other example(s) herein, further comprising: rate matching around one or more LTE CRSs of the LTE CRS pattern that are transmitted in a fully or partially overlapping the 5G CC.

Example A04 includes the method of example A01 and/or some other example(s) herein, wherein determining the one or more 5G DMRS symbol locations comprises: determining the one or more 5G DMRS symbol positions based on a PDSCH mapping type B scheme.

Example A05 includes the method of examples A01-A04 and/or some other example(s) herein, wherein: the PDSCH mapping type B scheme is for a 2 symbol PDSCH with one DMRS position wherein the DMRS position is symbol 0 or symbol 2; the PDSCH mapping type B scheme is for a 3 symbol PDSCH with one DMRS position wherein the DMRS position is symbol 0 or symbol 2; or the PDSCH mapping type B scheme is for a 4 symbol PDSCH with one DMRS position wherein the DMRS position is symbol 0 or symbol 2.

Example A06 includes the method of examples A01-A04 and/or some other example(s) herein, wherein the PDSCH mapping type B scheme is for a 5 symbol PDSCH, and wherein the one or more 5G DMRS positions include: a DMRS at symbol 2 and one additional DMRS at symbol 4 when a slot boundary of the PDSCH Mapping Type B scheme is aligned with a beginning and an end of the LTE CRS pattern; or a DMRS at symbol 1 and one additional DMRS at symbol 4 when the slot boundary of the PDSCH Mapping Type B scheme is aligned with the end of the LTE CRS pattern.

Example A07 includes the method of examples A01-A04 and/or some other example(s) herein, wherein the PDSCH mapping type B scheme is for a 6 symbol PDSCH, and when a slot boundary of the PDSCH Mapping Type B scheme is aligned with a beginning and an end of the LTE CRS pattern, the one or more 5G DMRS positions include a DMRS at one of symbol 0, symbol 2, or symbol 3, and one additional DMRS at symbol 4.

Example A08 includes the method of examples A01-A04 and/or some other example(s) herein, wherein the PDSCH mapping type B scheme is for a 7 symbol PDSCH, and wherein: when a slot boundary of the PDSCH Mapping Type B scheme is aligned with both a beginning and an end of the LTE CRS pattern, the one or more 5G DMRS positions include a DMRS at symbol 3 and one additional DMRS at symbol 6; or when a slot boundary of the PDSCH Mapping Type B scheme is aligned with a beginning of the LTE CRS pattern, the one or more 5G DMRS positions include a DMRS at symbol 0 or symbol 2 and one additional DMRS at symbol 4 or symbol 5.

Example A09 includes the method of examples A01-A04 and/or some other example(s) herein, wherein the PDSCH mapping type B scheme is for a 8 symbol PDSCH, and the one or more 5G DMRS positions include: a DMRS at symbol 2 or a DMRS at symbol 0 when a slot boundary of the PDSCH Mapping Type B scheme is aligned with an end or a beginning of the LTE CRS pattern, and one or two additional DMRSs, wherein: when one additional DMRS is configured the one additional DMRS position is symbol 6, and when two additional DMRSs are configured the two additional DMRS positions include symbol 4 and symbol 6.

Example A10 includes the method of examples A01-A04 and/or some other example(s) herein, wherein the PDSCH mapping type B scheme is for a 9 symbol PDSCH, and the one or more 5G DMRS positions include: a DMRS at symbol 2 or a DMRS at symbol 0 when a slot boundary of the PDSCH Mapping Type B scheme is aligned with an end of the LTE CRS pattern, and one or two additional DMRSs, wherein: when one additional DMRS is configured the additional DMRS position is symbol 6 or symbol 7, and when two additional DMRSs are configured the additional DMRS positions include a set selected from {symbol 5 and symbol 7}, {symbol 2 and symbol 6}, and {only one additional DMRS position at symbol 5}.

Example A11 includes the method of examples A01-A04 and/or some other example(s) herein, wherein the PDSCH mapping type B scheme is for a 10 symbol PDSCH, and the one or more 5G DMRS positions include: a DMRS at symbol 2 when a slot boundary of the PDSCH Mapping Type B scheme is aligned with a beginning of the LTE CRS pattern, or a DMRS at symbol 0 or symbol 1 when the slot boundary of the PDSCH Mapping Type B scheme is aligned with an end of the LTE CRS pattern; and one, two, or three additional DMRSs, wherein: when one additional DMRS is configured the additional DMRS position is symbol 7 or symbol 8; when two additional DMRSs are configured the additional DMRS positions include a set selected from: {only a single additional DMRS at symbol 6}, {symbol 3 and symbol 7}, {symbol 6 and symbol 8}, and {symbol 4 and symbol 7}; and when three additional DMRSs are configured the additional DMRS positions include another set selected from: {only a single additional DMRS position at symbol 6}, a {symbol 3, symbol 6, and symbol 9}, {symbol 2, symbol 6, and symbol 9}, {only two additional DMRS positions at symbol 5 and symbol 8}, and {only two additional DMRS positions at symbol 4 and symbol 7}.

Example A12 includes the method of examples A01-A04 and/or some other example(s) herein, wherein the PDSCH mapping type B scheme is for an 11 symbol PDSCH, and the one or more 5G DMRS positions include: a DMRS at symbol 2 or a DMRS at symbol 0 when a slot boundary of the PDSCH Mapping Type B scheme is aligned with an end of the LTE CRS pattern, and one, two, or three additional DMRSs, wherein: when one additional DMRS is configured the additional DMRS position is symbol 7, symbol 8, or symbol 10; when two additional DMRSs are configured the additional DMRS positions include a set selected from: {symbol 7 and symbol 10}, {symbol 4 and symbol 7}, {symbol 4 and symbol 8}, and {symbol 3 and symbol 7}; and when three additional DMRSs are configured the additional DMRS positions include another set selected from: {symbol 4, symbol 7, and symbol 10} and {symbol 3, symbol 7, and symbol 9}.

Example A13 includes the method of examples A01-A04 and/or some other example(s) herein, wherein the PDSCH mapping type B scheme is for an 12 symbol PDSCH, and the one or more 5G DMRS positions include: a DMRS at symbol 2 or a DMRS position is symbol 0 when a slot boundary of the PDSCH Mapping Type B scheme is aligned with an end of the LTE CRS pattern, and one, two, or three additional DMRSs are configured, wherein: when one additional DMRS is configured the additional DMRS position is symbol 10; when two additional DMRSs are configured the additional DMRS positions include a set selected from: {symbol 5 and symbol 10} and {symbol 4 and symbol 10}; when three additional DMRSs are configured the additional DMRS positions include another set selected from: {only including two additional DMRS positions at symbol 5 and symbol 10}, {symbol 3, symbol 5, and symbol 9}, {symbol 4, symbol 8, and symbol 10}, and {symbol 4, symbol 7, and symbol 10}.

Example A14 includes the method of examples A01-A04 and/or some other example(s) herein, wherein the PDSCH mapping type B scheme is for an 13 symbol PDSCH, and the one or more 5G DMRS positions include: a DMRS at symbol 2 when a slot boundary of the PDSCH Mapping Type B scheme is aligned with the beginning of the LTE CRS pattern or a DMRS at symbol 1 when the slot boundary of the PDSCH Mapping Type B scheme is aligned with an end of the LTE CRS pattern, and one, two, or three additional DMRS can be configured, wherein: when one additional DMRS is configured the additional DMRS position is symbol 9 or symbol 10; when two additional DMRSs are configured the additional DMRS positions include a set selected from {symbol 5 and symbol 10}, {symbol 6 and symbol 10}, and {symbol 5 and symbol 9}, and when three additional DMRS is configured the additional DMRS positions include another set selected from {symbol 5, symbol 10, and symbol 12}, {symbol 3, symbol 6, and symbol 9}, {symbol 5, symbol 9, and symbol 11}, and {symbol 4, symbol 7, and symbol 10}.

Example A15 includes the method of examples A01-A04 and/or some other example(s) herein, wherein the PDSCH mapping type B scheme is for an 14 symbol PDSCH, and the one or more 5G DMRS positions include: a DMRS at symbol 2 and one, two, or three additional DMRS can be configured, wherein: when one additional DMRS is configured the additional DMRS position is symbol 10; when two additional DMRSs are configured the additional DMRS positions include a set selected from: {symbol 5 and symbol 10} and {symbol 6 and symbol 10}; and when three additional DMRSs are configured the additional DMRS positions include a set selected from: {symbol 4, symbol 7, and symbol 10} and {symbol 5, symbol 10, and symbol 12}.

Example B01 includes a method comprising: determining a configuration that includes frequency domain allocations corresponding to respective Long Term Evolution (LTE) component carriers (CCs) that fully or partially overlap with one or more Fifth Generation (5G) CCs; rate matching around one or more LTE Cell-specific Reference Signal (CRS) patterns that are transmitted in the respective LTE CCs that are fully or partially overlapping with the one or more 5G CCs in which a Physical Downlink Shared Channel (PDSCH) transmission is to be received; and receiving the PDSCH transmission according to a PDSCH mapping type B scheme and based on the rate matching.

Example B02 includes the method of example B01, A01-A15, and/or some other example(s) herein, further comprising: determining the one or more LTE CRS patterns, the one or more LTE CRS patterns defining one or more Orthogonal Frequency Division Multiplexing (OFDM) symbols in which one or more LTE CRSs are to be transmitted; determining one or more 5G Demodulation Reference Signal (DMRS) positions in which one or more 5G DMRSs are to be transmitted; and demodulating and decoding the one or more 5G DMRSs at the one or more 5G DMRS positions for estimating the PDSCH, wherein: the 5G DMRS positions are defined such that the one or more 5G DMRSs do not collide with the one or more OFDM symbols that carry the one or more LTE CRSs, and a slot boundary of the PDSCH mapping type B scheme is aligned only with an end of an LTE subframe in which the one or more LTE CRSs are transmitted, only with a beginning of the LTE subframe, or with either the beginning or the end of the LTE subframe.

Example B03 includes the method of examples B01-B02, A01-A15, and/or some other example(s) herein, wherein the 5G CC operates with a 30 kilohertz (kHz) subcarrier spacing (SCS) or a 15 kHz SCS, and the LTE CC operates with a 15 kHz SCS.

Example B04 includes the method of examples B01-B03, A01-A15, and/or some other example(s) herein, wherein the PDSCH transmission is in the one or more 5G CCs that are partially or fully overlapped by the one or more LTE CCs.

Example B05 includes the method of examples B01-B04, A01-A15, and/or some other example(s) herein, further comprising: determining one or more LTE CRS patterns to rate match around using parameters included in an LTE CRS to match around information element (lte-CRS-ToMatchAround) included in a serving cell configuration (ServingCellConfig); and determining the one or more LTE CCs that fully or partially overlap with the one or more 5G CCs based on parameters indicated by an LTE CRS rate match pattern information element (RateMatchPatternLTE-CRS).

Example B06 includes the method of examples B01-B05, A01-A15, and/or some other example(s) herein, wherein the lte-CRS-ToMatchAround includes a RateMatchPatternLTE-CRS for each LTE CC of the one or more LTE CCs that fully or partially overlap with the one or more 5G CCs.

Example B07 includes the method of examples B01-B06, A01-A15, and/or some other example(s) herein, wherein each RateMatchPatternLTE-CRS is associated with a respective transmission/reception point (TRxP) of one or more TRxPs or with a respective panel of one or more panels of a multi-panel device, and the method further comprises: receiving the PDSCH transmission from the one or more TRxPs or the one or more panels of the multi-panel device.

Example B07.5 includes the method of example B07 and/or some other example(s) herein, wherein multi-panel device is a user equipment (UE) or a Radio Access Network (RAN) node.

Example B08 includes the method of examples B01-B07, A01-A15, and/or some other example(s) herein, wherein each RateMatchPatternLTE-CRS is associated with a respective TRxP identifier (ID) which is used to configure a CORESET containing the DCI which scheduled PDSCH transmissions from the given TRP.

Example B09 includes the method of examples B01-B08, A01-A15, and/or some other example(s) herein, wherein each RateMatchPatternLTE-CRS is associated with a respective Demodulation Reference Signal (DMRS) Code Division Multiplexing (CDM) group, A01-A15, and/or some other example(s) herein, wherein ports within each CDM group are associated with transmissions from individual TRxPs.

Example B10 includes the method of examples B01-B09, A01-A15, and/or some other example(s) herein, wherein each RateMatchPatternLTE-CRS is associated with a respective set of baseband ports associated with downlink transmissions from individual TRxPs.

Example B11 includes the method of examples B01-B10, A01-A15, and/or some other example(s) herein, wherein the method is performed by a UE or a RAN node.

Example Z01 includes an apparatus comprising means to perform one or more elements of a method described in or related to any of examples A01-A15, B01-B11, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples A01-A15, B01-B11, or any other method or process described herein. Example Z03 includes an apparatus comprising logic, modules, or circuitry to perform one or more elements of a method described in or related to any of examples A01-A15, B01-B11, or any other method or process described herein. Example Z04 includes a method, technique, or process as described in or related to any of examples A01-A15, B01-B11, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples A01-A15, B01-B11, or portions thereof. Example Z06 includes a signal as described in or related to any of examples A01-A15, B01-B11, or portions or parts thereof. Example Z07 includes a datagram, packet, frame, segment, protocol data unit (PDU), or message as described in or related to any of examples A01-A15, B01-B11, or portions or parts thereof, or otherwise described in the present disclosure. Example Z08 includes a signal encoded with data as described in or related to any of examples A01-A15, B01-B11, or portions or parts thereof, or otherwise described in the present disclosure. Example Z09 includes a signal encoded with a datagram, packet, frame, segment, protocol data unit (PDU), or message as described in or related to any of examples A01-A15, B01-B11, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples A01-A15, B01-B11, or portions thereof. Example Z11 includes a computer program comprising instructions, wherein execution of the program by a processing element is to cause the processing element to carry out the method, techniques, or process as described in or related to any of examples A01-A15, B01-B11, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein.

3. Hardware Systems and Configurations

Figure 9:
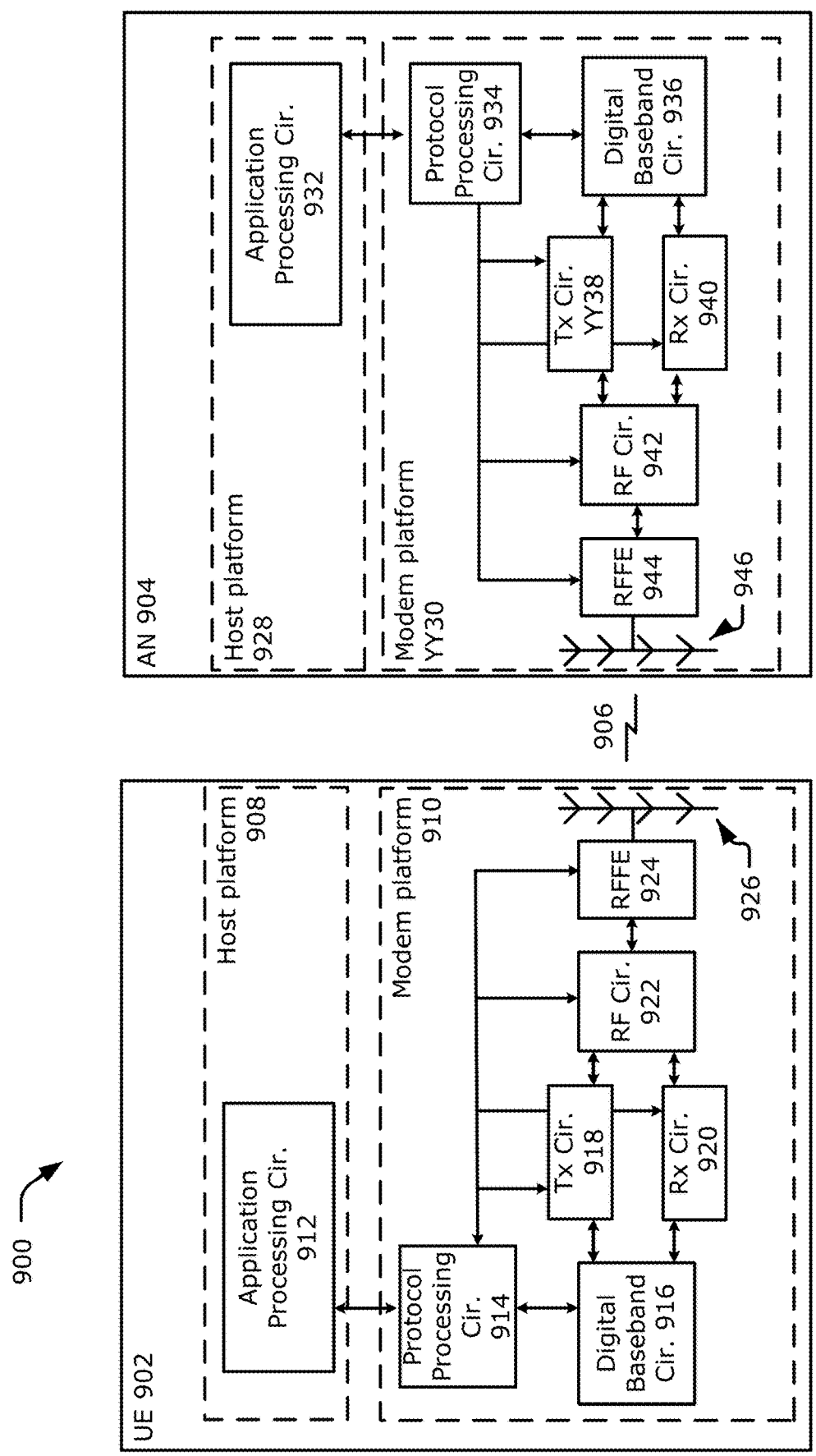
FIG. 9 schematically illustrates a wireless network in accordance with various embodiments.

FIG. 9 schematically illustrates a wireless network 900 in accordance with various embodiments. The wireless network 900 may include a UE 902 in wireless communication with an 904. The UE 902 and AN 904 may be similar to, and substantially interchangeable with, like-named components described elsewhere herein.

The UE 902 may be communicatively coupled with the AN 904 via connection 906. The connection YY06 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE 902 reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE 902 transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Figure 10:
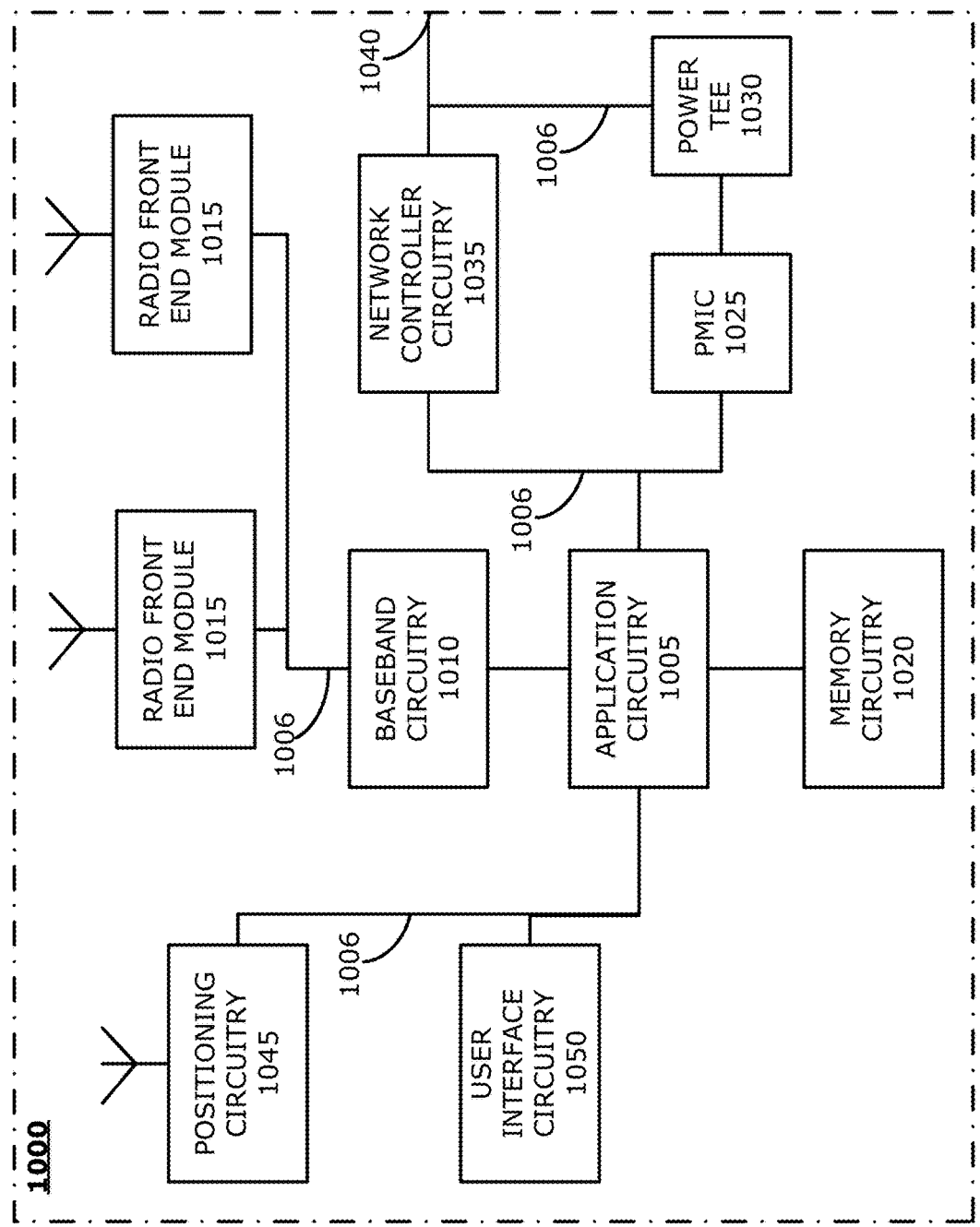
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, access network node, and/or any other element/device discussed herein. In other examples, the system 1000 could be implemented in or by an intermediate node 1220 or endpoint 1210.

The system 1000 includes application circuitry 1005, baseband circuitry 1010, one or more RFEMs 1015, memory circuitry 1020, PMIC 1025, power tee circuitry 1030, network controller circuitry 1035, network interface connector 1040, positioning circuitry 1045, and user interface 1050. In some embodiments, the device 1000 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices (PLDs) such as CPLDs, HCPLDs, and the like; ASICs such as structured ASICs and the like; programmable SoCs; and/or the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1005 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1010 may be implemented, for example, as a solder-down substrate including one or more integrated circuits, a single packaged integrated circuit soldered to a main circuit board or a multi-chip module containing two or more integrated circuits. The baseband circuitry 1010 includes one or more processing devices (e.g., baseband processors) to carry out various protocol and radio control functions. Baseband circuitry 1010 may interface with application circuitry of system 1000 for generation and processing of baseband signals and for controlling operations of the RFEMs 1015. The baseband circuitry 1010 may handle various radio control functions that enable communication with one or more radio networks via the RFEMs 1015. The baseband circuitry 1010 may include circuitry such as, but not limited to, one or more single-core or multi-core processors (e.g., one or more baseband processors) or control logic to process baseband signals received from a receive signal path of the RFEMs 1015, and to generate baseband signals to be provided to the RFEMs 1015 via a transmit signal path. In various embodiments, the baseband circuitry 1010 may implement a RTOS to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 10, in one embodiment, the baseband circuitry 1010 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1015 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1015 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1010 and/or RFEMs 1015. The baseband circuitry 1010 may also support radio communications for more than one wireless protocol.

Continuing with the aforementioned embodiment, the baseband circuitry 1010 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, RS generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 1015 may comprise a millimeter wave (mm-Wave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1015, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1020 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 1020 may be implemented as one or more of solder down packaged integrated circuits, socketed memory modules and plug-in memory cards. The memory circuitry 1020 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1000, an operating system of infrastructure equipment 1000, one or more applications, and/or for carrying out the embodiments discussed herein. The computational logic may be stored or loaded into memory circuitry 1020 as instructions for execution by the processors of the application circuitry 1005 to provide or perform the functions described herein. The various elements may be implemented by assembler instructions supported by processors of the application circuitry 1005 or high-level languages that may be compiled into such instructions. The permanent copy of the programming instructions may be placed into persistent storage devices of memory circuitry 1020 in the factory during manufacture, or in the field through, for example, a distribution medium (not shown), through a communication interface (e.g., from a distribution server), and/or OTA.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols. In various embodiments, the network controller circuitry 1035 enables communication with associated equipment and/or with a backend system (e.g., server(s) 1230 of FIG. 12), which may take place via a suitable gateway device.

The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various other infrastructure equipment, or the like.

The components shown by FIG. 10 may communicate with one another using interface circuitry 1006 or IX 1006, which may include any number of bus and/or IX technologies such as ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a Hyper-Transport interconnect, NVLink provided by NVIDIA®, and/or any number of other IX technologies. The IX technology may be a proprietary bus, for example, used in an SoC based system.

Figure 11:
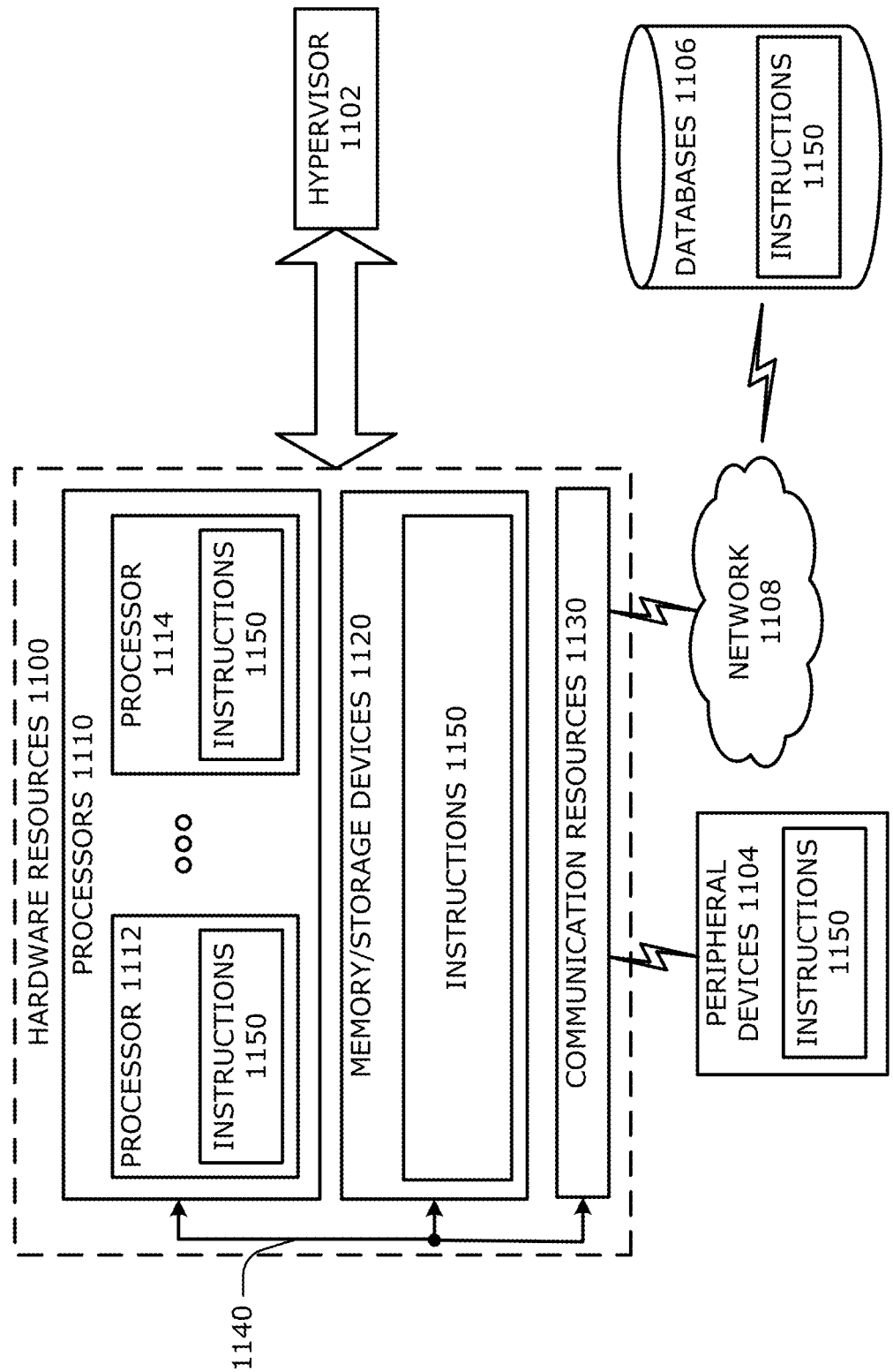
FIG. 11 illustrates components of a computing device according to some example embodiments.

FIG. 11 illustrates components of a computing device 1100 according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For embodiments where node virtualization (e.g., NFV) is utilized, a hypervisor 1102 may be executed to provide an execution environment for one or more network slices/subslices to utilize the hardware resources 1100.

The processors 1110 include, for example, processor 1112 and processor 1114. The processors 1110 include circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 1110 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 1110 may include one or more hardware accelerators, which may be microprocessors, programmable processing devices (e.g., FPGA, complex programmable logic devices (CPLDs), etc.), or the like.

The memory/storage devices 1120 may include main memory, disk storage, or any suitable combination thereof. The memory/storage devices 1120 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 1120 may also comprise persistent storage devices, which may be temporal and/or persistent storage of any type, including, but not limited to, non-volatile memory, optical, magnetic, and/or solid state mass storage, and so forth.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via USB, Ethernet, Ethernet, Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 1100 via the communication resources 1130 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 1130 may include one or more dedicated processors and/or FPGAs to communicate using one or more of the aforementioned network interface protocols.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

4. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. One or more non-transitory computer-readable media (NTCRM) comprising instructions, wherein execution of the instructions by one or more processors is to cause a user equipment (UE) to:
   determine a configuration of a Long Term Evolution (LTE) Cell-specific Reference Signal (CRS) pattern of a LTE Component Carrier (CC) that fully or partially overlaps with a Fifth Generation (5G) CC based on a 5G subframe within the 5G CC aligning with a beginning or an end of an LTE subframe in the LTE CC, wherein the LTE CC operates with a first subcarrier spacing (SCS), and the 5G CC operates with a second SCS different than the first SCS;
   determine one or more 5G Demodulation Reference Signal (DMRS) symbol positions within the 5G subframe based on a Physical Downlink Shared Channel (PDSCH) mapping type B scheme that will avoid reference signal collision between 5G DMRS symbols in the 5G subframe and LTE CRS symbols in the LTE subframe, based on the alignment of the 5G subframe within the 5G CC with the beginning or the end of the LTE subframe in the LTE CC; and
   demodulate and decode one or more 5G DMRSs based on the determined one or more 5G DMRS symbol positions for estimating a PDSCH associated with the one or more 5G DMRSs.

2. The one or more NTCRM of claim 1, wherein the first SCS is 30 kilohertz (kHz) and the second SCS is 15 kHz SCS.

3. The one or more NTCRM of claim 1, wherein execution of the instructions is to cause the UE to:
   rate match around one or more LTE CRSs of the LTE CRS pattern that are transmitted in the LTE CC that is a fully or partially overlapping with the 5G CC.

4. The one or more NTCRM of claim 1, wherein the PDSCH mapping type B scheme is for a 8 symbol PDSCH, a slot boundary of the 5G subframe is aligned with one or both of the end of the LTE subframe and the beginning of the LTE subframe, the one or more 5G DMRS symbol positions include a first position at symbol 2 or symbol 0 and at least one second position at symbol 6.

5. The one or more NTCRM of claim 4, wherein the PDSCH mapping type B scheme is for a 5 symbol PDSCH, and wherein, when a slot boundary of the 5G subframe is aligned with the end of the LTE subframe, the one or more 5G DMRS symbol positions include a first position at symbol 1 and at least one second position at symbol 4.

6. The one or more NTCRM of claim 1, wherein the PDSCH mapping type B scheme is for a 5 symbol PDSCH, and wherein the one or more 5G DMRS symbol positions include a first position at symbol 2 and at least one second position at symbol 4 when a slot boundary of the 5G subframe is aligned with the beginning of the LTE subframe and the end of the LTE subframe.

7. The one or more NTCRM of claim 1, wherein the PDSCH mapping type B scheme is for a 6 symbol PDSCH, and when a slot boundary of the 5G subframe is aligned with the beginning of the LTE subframe and the end of the LTE subframe, the one or more 5G DMRS symbol positions include a first position at one of symbol 0, symbol 2, or symbol 3 and at least one second position at symbol 4.

8. The one or more NTCRM of claim 1, wherein the PDSCH mapping type B scheme is for a 7 symbol PDSCH, and wherein:
   when a slot boundary of the 5G subframe is aligned with both the beginning and the end of the LTE subframe, the one or more 5G DMRS symbol positions include a first position at symbol 3 and at least one second position at symbol 6; or
   when a slot boundary of the 5G subframe is aligned with the beginning of the LTE subframe, the first position is at symbol 0 or symbol 2 and the at least one second position is at symbol 4 or symbol 5.

9. The one or more NTCRM of claim 1, wherein the PDSCH mapping type B scheme is for a 8 symbol PDSCH, a slot boundary of the 5G subframe is aligned with one or both of the end of the LTE subframe and the beginning of the LTE subframe, the one or more 5G DMRS symbol positions include a first position at symbol 2 or symbol 0 and two additional DMRS symbol positions at symbol 4 and symbol 6.

10. The one or more NTCRM of claim 1, wherein the PDSCH mapping type B scheme is for a 9 symbol PDSCH, a slot boundary of the 5G subframe is aligned with the end of the LTE subframe, the one or more 5G DMRS symbol positions include a first position at symbol 2 or symbol 0 and one or two additional DMRSs, wherein:
when one additional DMRS is configured, the one or more 5G DMRS symbol positions include a second position at symbol 6 or symbol 7, and
when two additional DMRSs are configured, the one or more 5G DMRS symbol positions include a set of symbol positions selected from {symbol 5 and symbol 7}, {symbol 2 and symbol 6}, and {only one additional DMRS of the two additional DMRSs at symbol 5}.

11. The one or more NTCRM of claim 1, wherein the PDSCH mapping type B scheme is for a 10 symbol PDSCH, and wherein:
the one or more 5G DMRS symbol positions include a first position at symbol 2 when a slot boundary of the 5G subframe is aligned with the beginning of the LTE subframe, or
the first position is at symbol 0 or symbol 1 when a slot boundary of the 5G subframe is aligned with the end of the LTE subframe; and
the one or more 5G DMRS symbol positions include one, two, or three additional DMRSs, wherein:
when one additional DMRS is configured, the one additional DMRS is at symbol 7 or symbol 8;
when two additional DMRSs are configured, the two additional DMRSs include a set of additional DMRS symbol positions selected from: {only a single additional DMRS at symbol 6}, {symbol 3 and symbol 7}, {symbol 6 and symbol 8}, and {symbol 4 and symbol 7}; or
when three additional DMRSs are configured, the three additional DMRSs include another set of additional DMRS symbol positions selected from: {only a single additional DMRS position at symbol 6}, a {symbol 3, symbol 6, and symbol 9}, {symbol 2, symbol 6, and symbol 9}, {only two additional DMRS symbol positions at symbol 5 and symbol 8}, and {only two additional DMRS symbol positions at symbol 4 and symbol 7}.

12. The one or more NTCRM of claim 1, wherein the PDSCH mapping type B scheme is for an 11 symbol PDSCH, and wherein:
the one or more 5G DMRS symbol positions include a first position at symbol 2 or symbol 0 when a slot boundary of the 5G subframe is aligned with the end of the LTE subframe, and
the one or more 5G DMRS symbol positions includes one, two, or three additional DMRSs, wherein:
when one additional DMRS is configured, the one additional DMRS is at symbol 7, symbol 8, or symbol 10;
when two additional DMRSs are configured, the two additional DMRSs include a set of additional DMRS symbol positions selected from: {symbol 7 and symbol 10}, {symbol 4 and symbol 7}, {symbol 4 and symbol 8}, and {symbol 3 and symbol 7}; or
when three additional DMRSs are configured, the three additional DMRSs include another of additional DMRS symbol positions set selected from: {symbol 4, symbol 7, and symbol 10} and {symbol 3, symbol 7, and symbol 9}.

13. The one or more NTCRM of claim 1, wherein the PDSCH mapping type B scheme is for a 12 symbol PDSCH, and wherein:
the one or more 5G DMRS symbol positions include a first position at symbol 2 or symbol 0 when a slot boundary of the 5G subframe is aligned with the end of the LTE subframe, and
the one or more 5G DMRS symbol positions includes one, two, or three additional DMRSs, wherein:
when one additional DMRS is configured, the one additional DMRS is at symbol 10;
when two additional DMRSs are configured, the two additional DMRSs include a set of additional DMRS symbol positions selected from: {symbol 5 and symbol 10} and {symbol 4 and symbol 10};
when three additional DMRSs are configured, the three additional DMRSs include another set of additional DMRS symbol positions selected from: {only including two additional DMRS symbol positions at symbol 5 and symbol 10}, {symbol 3, symbol 5, and symbol 9}, {symbol 4, symbol 8, and symbol 10}, and {symbol 4, symbol 7, and symbol 10}.

14. The one or more NTCRM of claim 1, wherein the PDSCH mapping type B scheme is for a 13 symbol PDSCH, and wherein:
the one or more 5G DMRS symbol positions include a first position at symbol 2 when a slot boundary of the 5G subframe is aligned with the beginning of the LTE subframe, or
the first position is at symbol 1 when a slot boundary of the 5G subframe is aligned with the end of the LTE subframe, and
the one or more 5G DMRS symbol positions includes one, two, or three additional DMRS, wherein:
when one additional DMRS is configured, the one additional DMRS is at symbol 9 or symbol 10;
when two additional DMRSs are configured, the two additional DMRSs include a set of additional DMRS symbol positions selected from {symbol 5 and symbol 10}, {symbol 6 and symbol 10}, and {symbol 5 and symbol 9}, and
when three additional DMRSs are configured, the three additional DMRSs include another set of additional DMRS symbol positions selected from {symbol 5, symbol 10, and symbol 12}, {symbol 3, symbol 6, and symbol 9}, {symbol 5, symbol 9, and symbol 11}, and {symbol 4, symbol 7, and symbol 10}.

15. The one or more NTCRM of claim 1, wherein the PDSCH mapping type B scheme is for a 14 symbol PDSCH, and the one or more 5G DMRS symbol positions include:
the one or more 5G DMRS symbol positions include a first position at symbol 2; and
the one or more 5G DMRS symbol positions includes one, two, or three additional DMRS, wherein:
when one additional DMRS is configured, the one additional DMRS is at the symbol 10;
when two additional DMRSs are configured, the two additional DMRSs include a set of additional DMRS symbol positions selected from: {symbol 5 and symbol 10} and {symbol 6 and symbol 10}; and
when three additional DMRSs are configured, the three additional DMRSs include another set of additional DMRS symbol positions selected from: {symbol 4, symbol 7, and symbol 10} and {symbol 5, symbol 10, and symbol 12}.

16. An apparatus to be implemented by a user equipment (UE), the apparatus comprising:
   baseband circuitry coupled with memory circuitry, the baseband circuitry to:
      determine a configuration that includes frequency domain allocations corresponding to respective Long Term Evolution (LTE) component carriers (CCs) that fully or partially overlap with one or more Fifth Generation (5G) CCs based on a 5G subframe within a 5G CC of the one or more 5G CCs aligning with a beginning or an end of an LTE subframe in an LTE CC of the respective LTE CCs, wherein the LTE CC operates with a first subcarrier spacing (SCS), and the 5G CC operates with a second SCS different than the first SCS;
      determine one or more LTE Cell-specific Reference Signal (CRS) patterns, the one or more LTE CRS patterns defining one or more Orthogonal Frequency Division Multiplexing (OFDM) symbols in which one or more LTE CRSs are to be transmitted;
      determine one or more 5G Demodulation Reference Signal (DMRS) symbol positions within the 5G subframe in which one or more 5G DMRSs are to be transmitted based on a Physical Downlink Shared Channel (PDSCH) mapping type B scheme that will avoid reference signal collision between 5G DMRS symbols in the 5G subframe and LTE CRS symbols in the LTE subframe, based on the alignment of the 5G subframe within the 5G CC with the beginning or the end of the LTE subframe in the LTE CC;
      rate match around one or more LTE CRSs of the LTE CRS patterns that are transmitted in the respective LTE CCs that are fully or partially overlapping with the one or more 5G CCs in which a PDSCH transmission is to be received; and
      demodulate and decode the one or more 5G DMRSs based on the determined one or more 5G DMRS symbol positions for estimating a PDSCH associated with the one or more 5G DMRSs; and
   radiofrequency (RF) circuitry communicatively coupled with the baseband circuitry, the RF circuitry to receive the PDSCH transmission according to the PDSCH mapping type B scheme and based on the rate matching.

17. The apparatus of claim 16, wherein the 5G DMRS symbol positions are defined such that the one or more 5G DMRSs do not collide with the one or more OFDM symbols in which the one or more LTE CRSs are to be transmitted.

18. The apparatus of claim 16, wherein the first SCS is a 30 kilohertz (kHz) SCS, and the second SCS is 15 kHz SCS.

19. The apparatus of claim 16, wherein the PDSCH transmission is in the one or more 5G CCs that are partially or fully overlapped by the one or more LTE CCs.

20. The apparatus of claim 16, wherein the baseband circuitry is further to:
   determine one or more LTE CRS patterns to rate match around using parameters included in an LTE CRS to match around information element (lte-CRS-ToMatchAround) included in a serving cell configuration (ServingCellConfig); and
   determine the one or more LTE CCs that fully or partially overlap with the one or more 5G CCs based on parameters indicated by an LTE CRS rate match pattern information element (RateMatchPatternLTE-CRS).

21. The apparatus of claim 20, wherein the lte-CRS-ToMatchAround includes a RateMatchPatternLTE-CRS for each LTE CC of the one or more LTE CCs that fully or partially overlap with the one or more 5G CCs.

22. The apparatus of claim 20, wherein each RateMatchPatternLTE-CRS is associated with a respective transmission/reception point (TRxP) of one or more TRxPs or with a respective panel of one or more panels of a multi-panel device, and the RF circuitry is to: receive the PDSCH transmission from the one or more TRxPs or the one or more panels of the multi-panel device.

23. The apparatus of claim 20, wherein each RateMatchPatternLTE-CRS is associated with a respective TRxP identifier (ID) which is used to configure a CORESET containing downlink control information which scheduled PDSCH transmissions from a given TRxP.

24. The apparatus of claim 20, wherein each RateMatchPatternLTE-CRS is associated with a respective Demodulation Reference Signal (DMRS) Code Division Multiplexing (CDM) group, wherein ports within each CDM group are associated with transmissions from individual TRxPs.

25. The apparatus of claim 20, wherein each RateMatchPatternLTE-CRS is associated with a respective set of baseband ports associated with downlink transmissions from individual TRxPs.

* * * * *

UNITED STATES PATENT AND TRADEMARK OFFICE
CERTIFICATE OF CORRECTION

PATENT NO. : 11,871,243 B2
APPLICATION NO. : 16/994229
DATED : January 9, 2024
INVENTOR(S) : Avik Sengupta et al.

It is certified that error appears in the above-identified patent and that said Letters Patent is hereby corrected as shown below:

In the Claims

Column 54
Claim 4, Line 26, replace "a", which is before "8 symbol" and after "scheme is for" with "an".

Column 54
Claim 9, Line 65, replace "a", which is before "8 symbol" and after "scheme is for" with "an".

Column 55
Claim 12, Line 57, replace "includes", which is before "one" and after "symbol positions" with "include".

Column 56
Claim 13, Line 11, replace "includes", which is before "one" and after "symbol positions" with "include".

Column 56
Claim 14, Line 38, replace "includes", which is before "one" and after "symbol positions" with "include".

Column 56
Claim 14, Line 39, replace "DMRS", which is before ",wherein" and after "three additional" with "DMRSs".

Column 56
Claim 15, Line 58, replace "includes", which is before "one" and after "symbol positions" with "include".

Signed and Sealed this
Tenth Day of September, 2024

Katherine Kelly Vidal
*Director of the United States Patent and Trademark Office*

Column 56
Claim 15, Line 59, replace "DMRS", which is before ",wherein" and after "three additional" with "DMRSs".

Column 58
Claim 18, Line 6, add "a", which is before "15kHz SCS" and after "SCS is".